(12) United States Patent
Beinhocker

(10) Patent No.: US 7,394,060 B2
(45) Date of Patent: *Jul. 1, 2008

(54) TAMPER DETECTION SYSTEM HAVING PLURALITY OF INFLATABLE LINER PANELS WITH OPTICAL COUPLERS

(75) Inventor: Gilbert D. Beinhocker, Belmont, MA (US)

(73) Assignee: Tamperproof Container Licensing Corp., Belmont, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,049

(22) Filed: Feb. 7, 2006

(65) Prior Publication Data

US 2006/0261259 A1 Nov. 23, 2006

Related U.S. Application Data

(63) Continuation-in-part of application No. 11/027,059, filed on Dec. 30, 2004, now Pat. No. 6,995,353, which is a continuation-in-part of application No. 10/981,836, filed on Nov. 5, 2004, now Pat. No. 7,211,783, which is a continuation-in-part of application No. 10/837,883, filed on May 3, 2004, now Pat. No. 7,098,444.

(60) Provisional application No. 60/706,501, filed on Aug. 8, 2005, provisional application No. 60/687,409, filed on Jun. 3, 2005.

(51) Int. Cl.
*G01J 1/04* (2006.01)

(52) U.S. Cl. .............................. 250/227.14; 250/227.16

(58) Field of Classification Search ................................
250/227.14–227.18, 474.1, 472.1; 385/12, 385/13, 31, 114, 120; 340/541, 545.6, 550, 340/555–557, 825.49, 539.2, 539.29
See application file for complete search history.

(56) References Cited

U.S. PATENT DOCUMENTS 2,311,613 A 2/1943 Slayter (Continued)

FOREIGN PATENT DOCUMENTS

WO WO 93/11513 6/1993

OTHER PUBLICATIONS

"AIS—USCG Navigation Center," http://www.navcen.uscg.gov/enav/ais.htm.

(Continued)

*Primary Examiner*—Que T Le
(74) *Attorney, Agent, or Firm*—Weingarten, Schurgin, Gagnebin & Lebovici LLP

(57) ABSTRACT

An inflatable sheet includes an optical fiber extending across at least a portion of its surface to detect a breach or nuclear radiation. The sheet can line at least a portion of a container or several such sheets can line several walls of the container. A breach of the sheet or radiation within or near the sheet reduces optical transmissibility of the fiber. The fiber integrates the radiation over time and/or over the length and volumetric mass of the fiber, making the fiber sensitive to even low-level radiation. The optical fiber is monitored for a change in its transmissibility. A reduction in the transmissibility, such as to below a threshold, can trigger an alarm, such as an annunciator, a self-destruct circuit or send a message that includes information about the time or the container's contents or location when the breach or radiation is detected to a central location, such as a ship's control room or port notification system.

23 Claims, 30 Drawing Sheets

U.S. PATENT DOCUMENTS

| | | | |
|---|---|---|---|
| 3,320,114 A | | 5/1967 | Schulz |
| 3,634,845 A | | 1/1972 | Colman ................ 340/274 |
| 3,714,644 A | | 1/1973 | Hellstrom ............. 340/274 |
| 3,947,837 A | | 3/1976 | Bitterice ............... 340/274 |
| 4,095,872 A | | 6/1978 | Stieff et al. ........... 351/96.24 |
| 4,118,211 A | * | 10/1978 | Au Coin et al. .......... 65/423 |
| 4,161,348 A | | 7/1979 | Ulrich ................. 350/96.2 |
| 4,175,827 A | | 11/1979 | McMahon ............. 350/96.14 |
| 4,195,907 A | | 4/1980 | Zamja et al. .......... 350/96.32 |
| 4,217,488 A | | 8/1980 | Hubbard ............... 455/612 |
| 4,228,425 A | | 10/1980 | Cooke ................. 340/550 |
| 4,234,875 A | | 11/1980 | Williams .............. 340/550 |
| 4,297,684 A | | 10/1981 | Butter ................. 340/557 |
| 4,367,460 A | | 1/1983 | Hodara ................ 340/550 |
| 4,447,123 A | | 5/1984 | Page et al. ........... 350/96.24 |
| 4,488,269 A | | 12/1984 | Robinson et al. |
| 4,538,527 A | | 9/1985 | Kitchen ................ 109/21 |
| 4,573,202 A | * | 2/1986 | Lee ..................... 383/3 |
| 4,603,252 A | | 7/1986 | Malek et al. ........... 250/227 |
| 4,772,092 A | | 9/1988 | Hofer et al. ........... 350/96.24 |
| 4,801,213 A | * | 1/1989 | Frey et al. ............ 383/3 |
| 4,867,820 A | | 9/1989 | Jacobson et al. ........ 156/101 |
| 4,931,771 A | | 6/1990 | Kahn .................. 340/556 |
| 4,935,723 A | | 6/1990 | Vallance .............. 340/550 |
| 4,972,176 A | | 11/1990 | Vallance .............. 340/550 |
| 5,049,855 A | | 9/1991 | Slemon et al. ......... 340/550 |
| 5,180,060 A | * | 1/1993 | Forti et al. ........... 206/522 |
| 5,194,847 A | | 3/1993 | Taylor et al. .......... 340/557 |
| 5,309,533 A | | 5/1994 | Bonniau et al. ........ 385/11 |
| 5,323,011 A | | 6/1994 | Suter et al. |
| 5,355,208 A | | 10/1994 | Crawford et al. ....... 356/35.5 |
| 5,359,416 A | | 10/1994 | Mueller ................ 356/371 |
| 5,568,124 A | | 10/1996 | Joyce et al. ........... 340/550 |
| 5,592,149 A | | 1/1997 | Alizi .................. 340/550 |
| 5,609,952 A | | 3/1997 | Weiss |
| 5,769,232 A | * | 6/1998 | Cash et al. ........... 206/522 |
| 5,790,025 A | | 8/1998 | Amer et al. ........... 340/571 |
| 6,002,501 A | | 12/1999 | Smith et al. .......... 359/110 |
| 6,065,870 A | * | 5/2000 | Nunez .................. 383/3 |
| 6,213,167 B1 | * | 4/2001 | Greenland ............. 141/10 |
| 6,556,138 B1 | | 4/2003 | Silva et al. .......... 340/568.1 |
| 6,879,257 B2 | | 4/2005 | Hisano et al. |
| 6,919,803 B2 | | 7/2005 | Breed |
| 7,098,444 B2 | | 8/2006 | Beinhocker |
| 7,211,783 B2 | | 5/2007 | Beinhocker |
| 2002/0089434 A1 | | 7/2002 | Ghazarian ............. 340/988 |
| 2003/0151509 A1 | | 8/2003 | Iannotti et al. ....... 340/541 |
| 2003/0174059 A1 | | 9/2003 | Reeves ................ 340/573.4 |
| 2003/0193032 A1 | | 10/2003 | Marshall .............. 250/474.1 |
| 2004/0037091 A1 | | 2/2004 | Guy .................... 362/582 |
| 2004/0046660 A1 | * | 3/2004 | Ando .................. 340/545.6 |
| 2004/0047142 A1 | | 3/2004 | Goslee ................ 362/84 |
| 2004/0056767 A1 | | 3/2004 | Porter ................ 340/541 |

OTHER PUBLICATIONS

Bonner, Robert C., "Remarks of U.S. Customs Commissioner Robert C. Bonner*: U.S. Customs and Border Protection C-TPAT Conferenence San Francisco, California Oct. 30, 2003," http://www.cpb.gov/xp/cgov/newsroom/commissioner/speeches_statements/0ct302003.xml.

Brichard et al., "Gamma dose rate effect in erbium-doped fibers for space gyroscopes" IEEE (2003).

Kimura et al., "New Techniques to Apply Optical Fiber Image Guide to Nuclear Facilities," J. Nuc. Sci. and Tech., vol. 39, No. 6, pp. 603-706 (Jun. 2002).

Lu et al., "Gamma-induced attenuation in normal single-mode and multimode, Ge-doped and P-doped optical fibers: A fiber optic dosimeter for low dose levels," Can. J. Phys. 78, pp. 89-97 (May 11, 2000).

Nucsafe Inc., "Fiber Sensing Technology—The Long and Short of It," http://nucsafe.com/Puma/introduction.htm (2004).

Nucsafe Inc., "Why Neutrons," http://nucsafe.com/Puma/why_neutrons.htm, (2004).

Nucsafe Inc., "Guardian CRMS," http://nucsafe.com/Puma/guardian_crms.htm, pp. 1, 4-8 (2004).

Nucsafe Inc., "Fiber Facility," http://nucsafe.com/Puma/fiber_facilities.htm, pp. 1-2(2004).

Nucsafe Inc., "Detecting Neutrons," http://nucsafe.com/Puma/detecting_neutrons.htm, pp. 1-3(2004).

Nucsafe Inc., "Photonics," http://nucsafe.com/Puma/pr_photonicsspectra.htm, pp. 1-2 (2004).

Nucsafe Inc., "Tech Transfer," http://nucsafe.com/Puma/pr_techtransfer.htm, pp. 1-2(2004).

Nucsafe Inc., "Press Release—First Applauds Job Creation at Oak Ridge Based-Nucsafe," http://nucsafe.com/Puma/pr_knoxnews.htm, pp. 1-3 (2004).

Nucsafe Inc., "Optical Properties," http://nucsafe.com/Puma/properties_of_scintillating_fibe.htm, (2004).

Ott, Melanie N., "Radiation Effects Data on Commercially Available Optical Fiber: Database Summary," Radiation Effects Data Workshop 2002 IEEE.

Ott, Melanie N., "Radiation Effects Expected for Fiber Laser/Amplifier Rare Earth Doped Optical Fiber," NASA Survey Report (Mar. 2004).

Poly-Optical Products, http://www.poly-optical.com/specifications.html.

Simpson, Doug, "US port security system set for launch," www.boston.com/news/nation/articles/2004/03/25/us_port_security_system_set_for_launch?mode=PF.

Giallorenzi et al. Optical fiber sensor technology, IEEE Journal of Quantum Electronics, vol. QE-18, No. 4 (Apr. 1982), pp. 626-665.

* cited by examiner

TAMPER DETECTION SYSTEM HAVING PLURALITY OF INFLATABLE LINER PANELS WITH OPTICAL COUPLERS

CROSS-REFERENCE TO RELATED APPLICATIONS

This application is a continuation-in-part of U.S. patent application Ser. No. 11/027,059, titled "Tamper Proof Container," filed Dec. 30, 2004, now U.S. Pat. No. 6,995,353, which is a continuation-in-part of U.S. patent application Ser. No. 10/981,836, titled "Tamper Proof Container," filed Nov. 5, 2004, now U.S. Pat. No. 7,211,783 which is a continuation-in-part of U.S. patent application Ser. No. 10/837,883, titled "Tamper Proof Container," filed May 3, 2004, now U.S. Pat. No. 7,098,444. This application claims the benefit of U.S. Provisional Application No. 60/706,501, titled "Tamper Proof Container," filed Aug. 8, 2005 and U.S. Provisional Application No. 60/687,409, titled "Tamper Proof Container," filed Jun. 3, 2005.

STATEMENT REGARDING FEDERALLY SPONSORED RESEARCH OR DEVELOPMENT (Not Applicable)

BACKGROUND OF THE INVENTION

1. Field of the Invention

The present invention relates to security systems for shipping containers, boxes and the like and, more particularly, to such security systems that can detect tampering with, or breaches in, surfaces of such containers or nuclear radiation from materials stored in the containers.

2. Description of the Prior Art

Cargo is often shipped in standardized containers, such as those used on trucks, trains, ships and aircraft. Smaller units of cargo are typically shipped in cardboard boxes and the like. It is often difficult or impossible to adequately guard these containers and boxes while they are in transit, such as on the high seas. In addition, some shipments originate in countries where port or rail yard security may not be adequate. Consequently, these containers and boxes are subject to tampering by thieves, smugglers, terrorists, and other unscrupulous people. A breached container can, for example, be looted or surreptitiously loaded with contraband, such as illegal drugs, weapons, explosives, contaminants or a weapon of mass destruction, such as a nuclear weapon or a radiological weapon, with catastrophic results. Alternatively, a nuclear or radiological weapon can radiological weapon, with catastrophic results. Alternatively, a nuclear or radiological weapon can be loaded by a rogue state or terrorist organization into such a container for shipment without necessarily breaching the container.

Such breaches and weapons are difficult to detect. The sheer number of containers and boxes being shipped every day makes it difficult to adequately inspect each one. Even a visual inspection of the exterior of a container is unlikely to reveal a breach. Shipping containers are subject to rough handling by cranes and other heavy equipment. Many of them have been damaged multiple times in the natural course of business and subsequently patched to extend their useful lives. Thus, upon inspection, a surreptitiously breached and patched container is likely to appear unremarkable. Furthermore, many security professionals would prefer to detect breached containers and radioactive cargoes prior to the containers entering a port and possibly preventing such containers from ever entering the port. The current method of placing a seal across the locking mechanism of a container door is of limited value, whether there is a physical breach of the container or not, because the nuclear or radiological weapon could be loaded by terrorist as legitimate cargo. For example, the terrorists could circumvent or corrupt inventory controls and cargo manifest delivery systems using unscrupulous confederates. A single breach or circumvention of a cargo delivery system by whatever means can have catastrophic consequences.

BRIEF SUMMARY OF THE INVENTION

Embodiments of the present invention can detect a breach of the interior surface of a shipping container or box or radiation from a source within or near the container or box and can then trigger an alarm or notify a central monitoring location, such as a ship's control room or a port notification system. At least one liner sheet lines at least a portion of at least one interior surface of the shipping container or box, such that a breach of the portion of the interior surface also damages the liner sheet or radiation from a source, such as a nuclear or radiological weapon, impinges on the liner sheet. Such a liner sheet can also be attached to other perimeter surfaces, such as fences or building walls, to detect breaches of the surfaces or radiation near the surfaces. The liner sheet defines an optical path extending across at least a portion of the sheet. The optical path is monitored for a change, such as a loss or reduction of continuity, in an optical characteristic of the optical path or a change in a characteristic of the light signal, such as a frequency or phase shift. If the container, box interior or other monitored surface is breached or the optical path is irradiated, one or more portions of the optical path are affected and the optical path is broken or altered. For example, a breach of the container or box can break the optical path. Alternatively, radiation can reduce or alter the light transmissibility of the optical path. The detected change in the optical path can be used to trigger an alarm, such as an annunciator or cause a notification signal to be sent to a monitoring station via any of a wide variety of existing networks, such as the Internet and/or a wireless telecommunications network. In addition, a detailed accompanying message can provide information about the nature of the breach, time, location, cargo manifest, etc.

BRIEF DESCRIPTION OF THE SEVERAL VIEWS OF THE DRAWINGS

These and other features, advantages, aspects and embodiments of the present invention will become more apparent to those skilled in the art from the following detailed description of an embodiment of the present invention when taken with reference to the accompanying drawings, in which the first digit of each reference numeral identifies the figure in which the corresponding item is first introduced and in which.

DETAILED DESCRIPTION OF THE INVENTION

The contents of: U.S. patent application Ser. No. 11/027,059, titled "Tamper Proof Container," filed Dec. 30, 2004, now U.S. Pat. No. 6,995,353; U.S. patent application Ser. No. 10/981,836, titled "Tamper Proof Container," filed Nov. 5, 2004; U.S. patent application Ser. No. 10/837,883, titled "Tamper Proof Container," filed May 3, 2004; U.S. Provisional Application No. 60/706,501, titled "Tamper Proof Container," filed Aug. 8, 2005; U.S. Provisional Application No. 60/687,409, titled "Tamper Proof Container," filed Jun. 3, 2005; and U.S. Provisional Application No. 60/535,449, titled "Tamper Proof Container," filed Jan. 9, 2004, are all hereby incorporated by reference herein.

The present invention provides methods and apparatus to detect tampering with a six-sided or other type of container or box or other surface or a source of radiation within or near the container, box or surface, as well as methods of manufacturing such apparatus. A preferred embodiment detects a breach in a monitored surface of a container, box or fence or radiation from a source. A liner sheet lines at least a portion of an interior surface of the container, box or fence, such that a breach of the portion of the container interior surface or fence damages the liner sheet or radiation from the source impinges on at least a portion of the liner sheet. The liner sheet defines an optical path extending across at least a portion of the sheet. For example, an optical fiber can be woven into, or sandwiched between layers of, the liner sheet. The optical path is monitored for a change in an optical characteristic of the optical path. For example, a light source can illuminate one end of the optical fiber, and a light sensor can be used to detect the illumination, or a change therein, at the other end of the optical fiber. If the container, box or fence surface is breached, one or more portions of the optical fiber are severed or otherwise damaged, and the optical path is broken or altered. If radiation, such as gamma rays, irradiates all or a portion of the optical fiber, the transmissibility of irradiated portion(s) of the optical fiber changes, and the optical path is altered. The detected change in the optical path can be used to trigger an alarm, such as an annunciator. In addition, a message can be sent, such as by a wireless communication system and/or the Internet, to a central location, such as a ship's control room or a port notification system. In some embodiments, as little as a single nick, cut, pinch, bend, compression, stretch, twist or other damage to the optical fiber can be detected, thus a change in the light transmissibility characteristic of a single optical fiber can protect the entire volume of the container or box.

Figure 1:
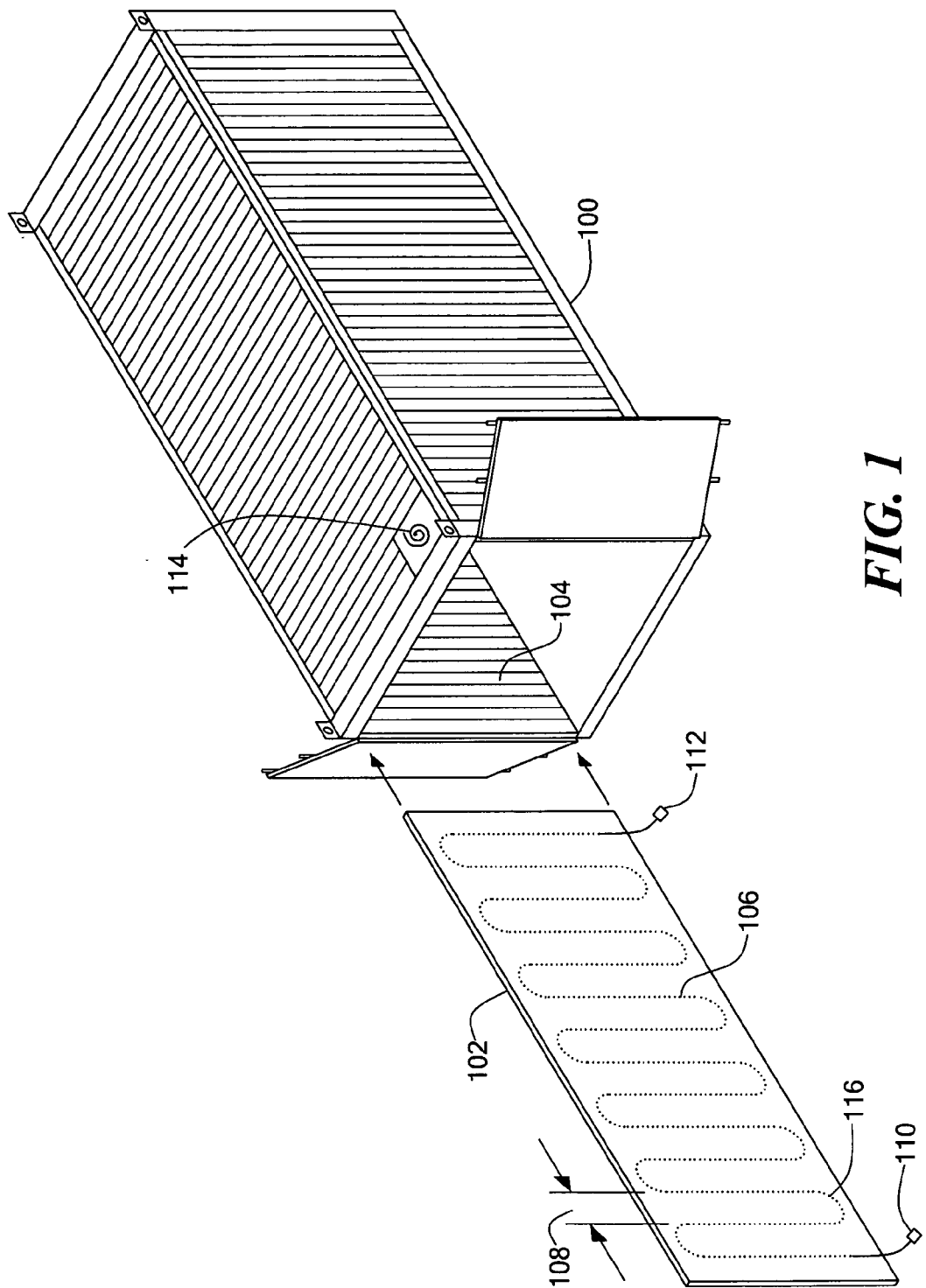
FIG. 1 is a perspective view of a liner sheet, according to one embodiment of the present invention, being inserted into a shipping container.

Embodiments of the present invention can be used in containers typically used to transport cargo by truck, railroad, ship or aircraft. FIG. 1 illustrates an embodiment of the present invention being inserted into one such container 100. In this example, the container 100 is an ISO standard container, but other types of containers or boxes can be used. The embodiment illustrated in FIG. 1 includes a rigid, semi-rigid or flexible panel 102 sized to correspond to an interior surface, such as an inside wall 104, of the container 100. The panel 102 can be slid into the container 100 and optionally attached to the inside wall 104, such as by eyelets or loops (not shown) on the panel and hooks, screws, bolts, toggles or other suitable fasteners (not shown) on the inside wall. Other attachment mechanisms, such as adhesives or hook-and-pile systems (commercially available under the trade name Velcro®) are also acceptable. In this manner, the panel 102 can later be removed from the container 100. In any case, the panel 102 can be removeably attached to the inside wall 104 or it can be permanently or semi-permanently attached thereto. Optionally, additional panels (not shown) can be attached to other interior surfaces, such as the opposite wall, ceiling, floor, end or doors, of the container 100. All these panels can be connected to a detection circuit, as described below. Alternatively, the container 100 can be manufactured with integral panels pre-installed therein.

As noted, the panel 102 is preferably sized to correspond to the surface to which it is to be attached. For example, an ISO standard 20-foot container has interior walls that are 19.3 ft long and 7.8 ft high. (All dimensions are approximate.) Such a container has a 19.3 ft. long by 7.7 ft wide floor and ceiling and 7.7 ft wide by 7.8 ft. high ends. An ISO standard 40-foot container has similar dimensions, except each long interior dimension is 39.4 ft. ISO standard containers are also available in other lengths, such as 8 ft., 10 ft., 30 ft. and 45 ft. Containers are available in several standard heights, including 4.25 ft. and 10 ft. Other embodiments can, of course, be used with other size containers, including non-standard size containers. The panel 102 is preferably slightly smaller than the surface to which it is to be attached, to facilitate installation and removal of the panel.

The panel 102 includes an optical fiber 106 extending across an area of the panel. The optical fiber 106 can be positioned serpentine- or raster-like at regular intervals, as indicated at 108. A "pitch" can be selected for this positioning, such that the spacing 108 between adjacent portions of the optical fiber 106 is less than the size of a breach that could compromise the security of the container. Alternatively, the optical fiber 106 can be distributed across the panel 102 according to another pattern or randomly, examples of which are described below. In other embodiments, the panel 102 can be eliminated, and the optical fiber can be permanently or removeably attached directly to the interior surface of the container 100. For example, adhesive tape can be used to attach the optical fiber to the interior surface. The optical fiber can be embedded within the adhesive tape and dispensed from a roll, or the optical fiber and adhesive tape can be separate prior to installing the optical fiber. In yet other embodiments, the container 100 is manufactured with optical fibers attached to its interior surfaces or sandwiched within these surfaces.

Optical connectors 110 and 112 are preferably optically attached to the ends of the optical fiber 106. These optical connectors 110 and 112 can be used to connect the panel 102 to other panels (as noted above and as described in more detail below) or to a circuit capable of detecting a change in an optical characteristic of the optical fiber. The optical connectors 110 and 112 can be directly connected to similar optical connectors on the other panels or the detector circuit. Alternatively, optical fiber "extension cords" can be used between the panel and the other panels or detector circuit.

Figure 2:
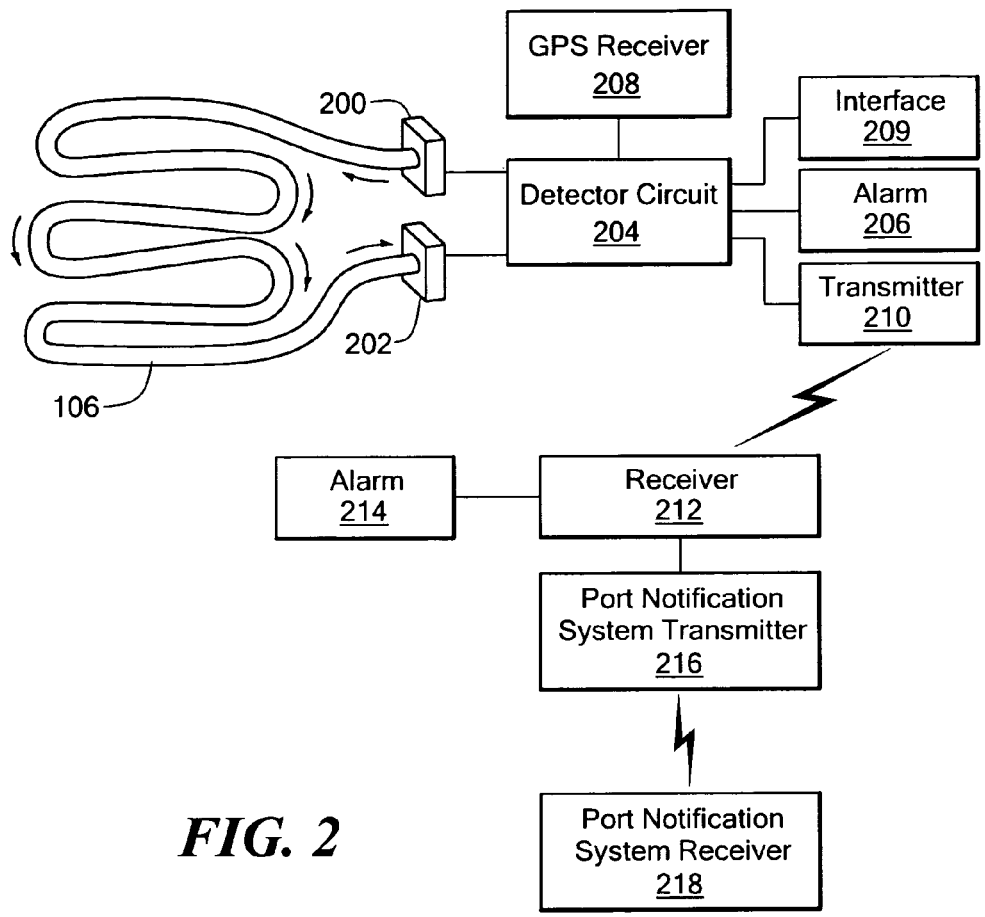
FIG. 2 is a simplified schematic diagram of major and optional components of a monitoring system, according one embodiment of the present invention.

As noted, a detector circuit is configured to detect a change in an optical characteristic of the optical fiber 106. As shown in FIG. 2, one end of the optical fiber 106 is optically connected (such as via optical connector 110) to a visible or invisible light source 200. The other end of the optical fiber 106 is connected to a light detector 202. The light source 200 and light detector 202 are connected to a detector circuit 204, which is configured to detect a change in the optical characteristic of the optical fiber 106. For example, if the light source 200 continuously illuminates the optical fiber 106 and the optical fiber is severed or otherwise damaged as a result of a breach of the container 100, the light detector 202 ceases to detect the illumination and the detector circuit 204 can trigger an alarm. Similarly, the detector circuit 204 can detect a decrease in, or complete loss of, light transmissibility of the optical fiber 106 as a result of the optical fiber being irradiated, such as by gamma rays from a radiological weapon stored in or near the optical fiber. Thus, the detector circuit 204 can trigger the alarm if the optical characteristic changes by a predetermined amount. Optical characteristic changes include, without limitation, intensity, frequency, phase, coloration of optical fiber dopants and self-annealing properties of optical fiber that has been irradiated.

The change in the optical characteristic need not be a total change. For example, in transit, as cargo shifts position within the container 100, some cargo might partially crush, compress, twist, stretch or stress the panel 102 and thereby reduce, but not to zero, the light-carrying capacity of the optical fiber 106. To accommodate such a situation without sounding a false alarm, the detector circuit 204 can trigger the alarm if the amount of detected light falls below, for example, 30% of the amount of light detected when the system was initially activated. Optionally, if the system detects a reduction in light transmission that does not exceed such a threshold, the system can send a signal indicating this reduction and warning of a likely shift in cargo or some environmental deterioration of the panel, as opposed to a breach of the container 100.

As noted, a system according to the present disclosure can be used to detect radiation from a source within or near a container. In such a system, an optical characteristic of the optical fiber is changed by radiation incident on the fiber, and this changed optical characteristic is detected. For example, if an optical fiber is exposed to nuclear radiation, the light transmissibility of the optical fiber is reduced over time due to darkening of the optical fiber. The radiation may be of various types, including alpha, beta, neutron, gamma or certain other types of electromagnetic radiation.

The light transmissibility of an optical fiber is reduced if the optical fiber is exposed to ionizing radiation, such as nuclear radiation. Radiation-induced absorption (RIA) induces ionization and creates color centers in the optical fiber, thereby reducing the optical transmissibility of the fiber. This "radiation-induced darkening" (which attenuates light signals) is cumulative over time, leading to a time-integration effect. Thus, even a low radiation dose rate over a multi-day trans-Atlantic journey would cause a detectable reduction in the transmissibility of the optical fiber. If an optical fiber that has been partially darkened by radiation is to be reused, the detector circuit 204 can calibrate itself to the fiber's then-current transmissibility when a panel containing the fiber is sealed in a subsequent container. The detector circuit 204 measures the amount of light the optical fiber transmits, and the detector triggers the alarm if it detects a further attenuation of the transmitted light. Alternatively, the radiation-darkened optical fiber can be discarded.

The degree of radiation need not necessarily be measured. Instead, only the presence or absence of radiation above a threshold can be detected to indicate the presence of a radioactive or other radiation emitting material or device. Thus, a system according to the present disclosure can provide a binary (Yes/No) indication of the presence of radiation. Optionally, the amount of darkening of the fiber or the rate of darkening can be used to estimate the strength of the radiation source or its distance from the panel(s). Such measurements from a number of containers can be used to estimate the location of a container, among many containers, that houses a radiation source. For example, if a number of systems (that are roughly aligned along a line) detect progressively higher levels of radiation, the source of the radiation is likely to lie along the line in the direction of the higher radiation level. If two or more such lines (roughly) intersect, the radiation source is likely to lie at the intersection.

Panels lining a typical ISO container can include as much as four kilometers or more of optical fiber. Because light travels the entire length of each optical path, the attenuation of this light is proportional to the sum of the lengths of all the darkened portions of the optical fibers that make up the optical path. Thus, even a small amount of radiation-induced darkening along some or all parts of the optical fiber(s) "adds up" to a detectable change in transmissibility of the fiber. The term "volumetric mass" is used herein to refer to the amount of optical fiber through which light travels between a source and a detector. The system is inherently sensitive to radiation induced darkening, due to the volumetric mass of optical fiber per panel or per container. Furthermore, even if a radiation source is partially shielded, such that only portions of the panels are irradiated, the system can detect the radiation source, because it does not matter which portion(s) of the optical fiber are irradiated.

Some optical fibers are more sensitive to radiation-induced absorption than other optical fibers. Optical fiber manufacturers and others have endeavored to develop optical fibers that are less sensitive to radiation-induced absorption, such as for use in outer space, nuclear reactors and particle accelerators. These manufacturers and others have published information comparing the sensitivities of various optical fibers to radiation-induced absorption, as well as techniques for making optical fibers that are less sensitive to RIA. However, these publications teach away from the present invention, in that systems according to the present disclosure preferably use optical fibers that are more sensitive to RIA.

Various techniques can be used to increase the sensitivity of optical fibers to radiation-induced absorption. For example, increasing the volumetric mass of optical fiber, such as by spacing the optical fibers more closely together, therefore including more optical fiber pre unit area of the panels, or including more than one layer of optical fiber, increases the sensitivity to radiation.

The amount of radiation-induced attenuation experienced by a light signal carried over an optical fiber depends on the wavelength of the signal, the type of optical fiber (single mode, multi-mode, polarization-maintaining, etc.), manufacturer, model and other factors. The wavelength of the light source 200 (FIG. 2) is preferably selected to maximize the sensitivity of the optical fiber to radiation-induced darkening. Some optical fibers have two relative maximum attenuation peaks, such as at about 472 nm and about 502 nm. Other optical fibers have more than two relative maximum attenuation peaks, such as at about 470 nm, about 502 nm, about 540 nm and about 600 nm. Most optical fibers exhibit greater attenuation at shorter wavelengths than at longer wavelengths over the working optical spectrum, thus shorter optical wavelengths are preferred. For example, if a single-wavelength light source is used, any wavelength (up to about 1625 nm or longer) can be used, however a shorter wavelength is preferred. Examples of acceptable wavelengths include about 980 nm, about 830 nm, about 600 nm, about 540 nm, about 502 nm and about 472 nm, although other relatively short wavelengths are acceptable.

Other factors, such as manufacturer and model, can also be selected for maximum sensitivity to radiation-induced darkening. For example, optical fiber available from Corning under part number SMF-28 exhibits acceptable radiation-induced darkening characteristics. Single mode, multi-mode, polarization-maintaining and other types of optical fibers are acceptable.

Figure 24:
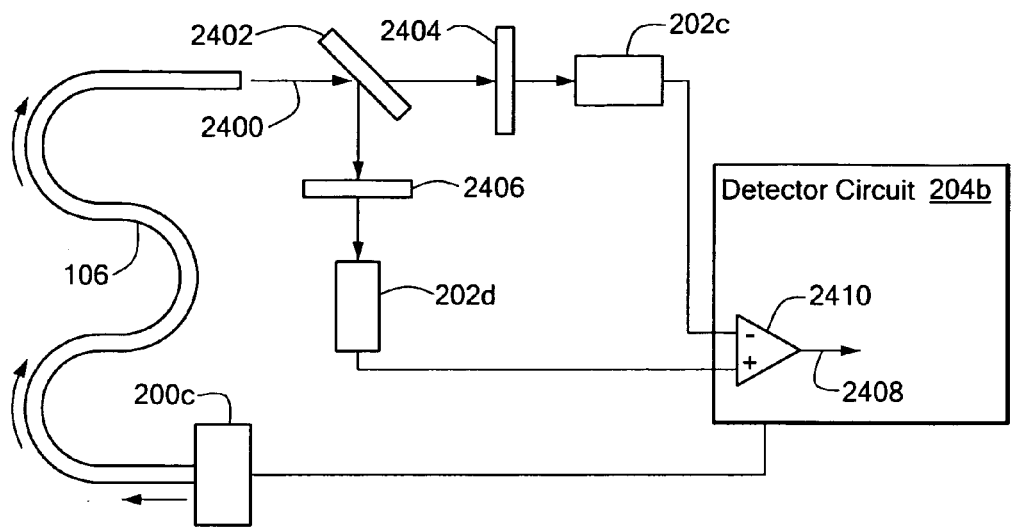
FIGS. 24 and 25 are simplified schematic diagrams of major components of monitoring systems, according other embodiments of the present invention.

Alternatively, a difference in the attenuations of short-wavelength and long-wavelength light components passing through the optical fiber can be used to trigger a detector circuit 204*b*, as shown in FIG. 24. If a multi-wavelength light source 200*c* (such as an incandescent lamp) is used, light 2400 that reaches the far end of the optical fiber 106 is split by a beam splitter 2402. One portion of the split beam passes through a first filter 2404 that passes short-wavelength light, which is then detected by a light sensor 202*c*. Another portion of the split beam passes through a second filter 2406 that passes long-wavelength light, which is then detected by a second light sensor 202*d*. For example, the first filter can pass light having a wavelength less than about 980 nm, and the second filter can pass a light having a wavelength greater than about 980 nm. A difference signal 2408 is produced by a differential amplifier 2410 from outputs of the two light sensors 202*c* and 202*d*. If the optical fiber 106 is darkened by radiation, this darkening would be more pronounced at short wavelengths than at long wavelengths, thus the output signal from the first (short wavelength) light sensor 202*c* would be less than the output signal from the second (long wavelength) light sensor 202*d*, and the difference between the signals from the light sensors would be detected by the differential amplifier 2410. Just before or after sealing a container, the difference between the signals is noted and stored, such as in a memory (not shown) in the detector circuit 204*b*. Later, if the difference between the signals increases, for example if the difference exceeds a predetermined threshold, the alarm is trigger.

Of course, the differential amplifier 2410 can be replaced by any circuit or software that compares the signals from the light sensors 202*c* and 202*d* or calculates a difference between the signals. For example, two digital-to-analog converters (DACs) can be respectively connected to the light sensors 202*c* and 202*d*, and outputs from the DACs can be digitally compared or one of the outputs can be digitally subtracted from the other output, and the difference can be compared to a threshold value.

Figure 25:
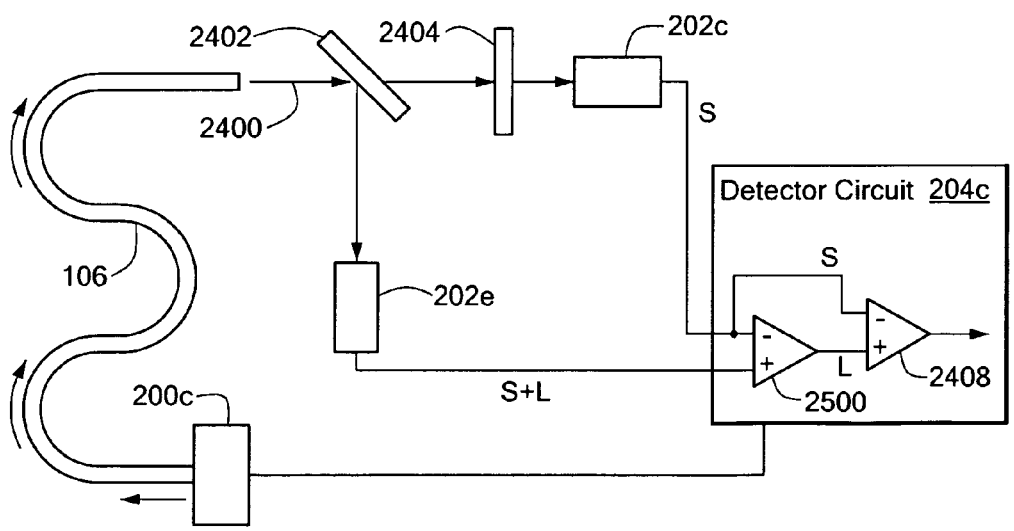

Alternatively, as shown in FIG. 25, one of the filters can be omitted. In this case, the filter 2404 passes short-wavelength light, which is detected by the light sensor 202*c* to produce a short-wavelength signal S, as discussed above. The other light sensor 202*e* is unfiltered, thus it detects both short-wavelength light and long-wavelength light to produce a short- and long-wavelength signal (S+L). A first differential amplifier 2500 produces a difference signal (S+L)−S=L that represents the amount of long-wavelength light emerging from the optical fiber 106. A second differential amplifier 2408 operates as discussed above to produce a signal that represents the difference between the amount of short-wavelength and long-wavelength light emerging from the optical fiber 106.

Thermal annealing can release charges trapped within an optical fiber, thus at least partially reversing the effect of radiation-induced absorption. However, this thermal annealing can not occur at cold temperatures, such as those likely to be encountered during an ocean-going voyage in cool climates. To minimize the temperature of a container, and thus minimize thermal annealing of the optical fiber, the container can be loaded low in the hold of a ship or below other containers to reduce or eliminate sunlight shining on the container. The average temperature of the container is preferably kept less than or equal to about 25° C.

Some published information suggests using radiation-induced attenuation to measure radiation in optical fiber-based dosimeters, however such systems rely on thermal annealing to enable the optical fiber to quickly recover after being irradiated and be used for subsequent measurements. Thus, these publications teach selecting or constructing optical fibers that exhibit good recovery characteristics. These publications teach away from the present invention, in that systems according to the present disclosure preferably use optical fibers that have poor recovery characteristics and/or are operated so as to minimize or prevent recovery.

Radiation sensitivity of optical fiber is highly dependent on dopants used in the manufacture of the fiber. Typical dopants include erbium, ytterbium, aluminum, phosphorus and germanium. Dopants, such as phosphorus, that increase the index of refraction of the core of the fiber are particularly influential in increasing the radiation sensitivity of optical fiber. Radiation sensitivity increases with erbium content. In addition, greater aluminum content in the core of an erbium-doped optical fiber increases the sensitivity of the fiber to radiation-induced effects. For example, an optical fiber doped with about 0.18 mol % Yb, about 4.2 mol % $Al_2O_3$ and about 0.9 mol % $P_2O_5$ exhibits an order of magnitude more attenuation than an optical fiber doped with almost the same amounts of Yb and $P_2O_5$ but only about 1.0 mol % $Al_2O_3$.

Lanthanum can also be used as a dopant. For example, an optical fiber doped with about 2.0 mol % La and about 6.0 mol % $Al_2O_3$ is extremely sensitive to radiation-induced effects, compared to Yb-doped and Er-doped optical fibers.

A trace amount of fissionable material (such as commercially-available, low-grade Uranium-238) can also be used as a dopant in the optical fiber and/or in the cladding. In the presence of radiation from another source within the container or from outside the container, the fissionable material contributes neutrons as a result of collisions between particles from the other radiation source and the fissionable material nuclei. Thus, the fissionable material "amplifies" the other radiation, producing additional radiation to darken the optical fiber or darken the fiber more quickly than the other radiation would do alone.

In the absence of other radiation, the fissionable material produces some radiation of its own and, thus, can cause some darkening of the optical fiber. The detection circuit can compensate for the expected rate and amount of darkening from the dopant fissionable material.

Uranium-238 (U-238) has a half life of 4.5 billion years, thus it decays very slowly. Absent radiation from another source, radiation from a U-238 dopant would be barely above a typical background level. Thus, radiation-induced darkening from the U-238 dopant would be small or negligible.

The optical fiber preferably includes one or more of the dopants listed above to increase or maximize its sensitivity to radiation.

Ytterbium-doped optical fiber and germanium-doped optical fiber can become "saturated" with radiation-induced absorption. When saturated, the annealing affects and the radiation-induced trapped charges balance, such that the radiation-induced attenuation reaches a constant value, even in the face of increasing total radiation dosage (at a constant dose rate). The predetermined amount, by which the optical characteristic must change before the detector circuit 204 triggers the alarm, should take into account this saturation. Thus, the detector circuit 204 triggers the alarm preferably before the optical fiber becomes saturated.

Fluorine and boron are sometimes used to lower the index of refraction of optical fiber cladding. When it is used to dope the core of an optical fiber, fluorine increases radiation resistance, so optical fibers without fluorine or with minimal fluorine in the core are preferred.

Naturally-occurring, background ionizing radiation, which measures about 300 millirems per year in the United States, can have a long-term effect on the transmissibility of optical fiber. The detector circuit 204 can account for a slow degradation in the optical fiber's transmissibility as a result of this background radiation, so the detector circuit does not generate false alarms.

Figure 3:
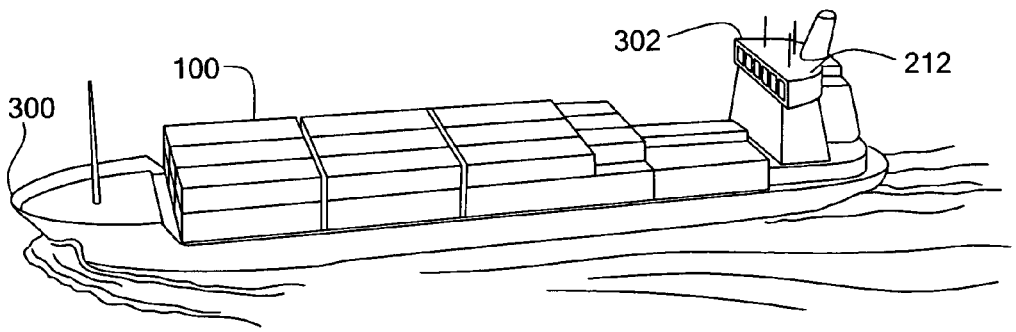
FIG. 3 is a perspective view of one context in which embodiments of the present invention can be advantageously practiced.

Gamma radiation easily penetrates the metallic walls of shipping containers. Thus, a system disposed within one container can detect radiation from a source within the container, as well as from a source in a nearby container, even if the nearby container is not equipped with its own radiation detection system. In transit, containers are typically stacked side-by-side and on top of one another, as shown in FIG. 3. Thus, gamma radiation from one container is likely to be detected by systems in adjacent containers. The number and positions of the adjacent containers where radiation is detected depend on several factors, including the strength of the radiation source, the number and thicknesses of intervening metallic walls of other containers and the time-integration period over which the radiation impinges on the optical fibers. Even if the container that houses the radiation source is not equipped with a radiation detection system, the locations and pattern of containers whose systems detect radiation (and optionally the amount of radiation detected by the respective systems) can be used to identify the location of the radiation-emitting container.

Nuclear materials typically generate heat as they decay. If a nuclear material were to be stored or shipped inside a suitably thermally insulated container, the heat generated by the material would increase the temperature inside the container. A thermal barrier or insulator having a high R-value can be used to thermally insulate a container. The thermal barrier or insulator can be part of the liner panels described herein. The thermal barrier or insulator can be made of any suitable material, such as fiberglass, closed-cell foam, microfiber, Aerogel, foil, or a combination thereof.

In one embodiment, one or more heat sensors detect the temperature within the container or the temperature gradient between the inside of the container and the outside of the container (or across the thermal insulation). If the sensor (or the circuit) detects a temperature, temperature gradient or temperature change over time that exceeds an expected value or follows a characteristic "profile," the system determines that nuclear material (or some other unexpected heat source, such as a stowaway or a fire) is present within the container. Alternatively, the system can compare the internal temperatures of several adjacent or nearby containers to determine if one of the containers has a higher internal temperature than its neighbors. A relatively "hot" container can be identified as containing nuclear material or another unexpected heat source. Temperature measuring devices with high resolution are readily available on an inexpensive basis. The output of a measurement above a predetermined level would constitute an alarm signal. Such a yes/no alarm signal could be multiplexed through a "platform" "OR gate" with other sensors (chemical, biological, sound, etc.) and be used to turn off the light source in the signal optical pathway, thereby causing the photodetector to detect an absence of light and transmit an alarm signal to a monitoring station.

The heat output of nuclear material follows the same characteristic curve as the radiation (i.e. decay) curve. Thus, the rate of change or the profile of the temperature (or temperature gradient) can be used to identify the isotope or amount of nuclear material present. The rate of change or profile can also be used to distinguish between a nuclear heat source and another heat source, such as a fire. For example, an internal container temperature caused by a fire rises much more rapidly than an internal temperature caused by a nuclear material.

Returning to FIG. 2, the detector circuit 204 and other components of the tamper detection system that reside in the container 100 can be powered by a battery, fuel cell, thermocouple, generator or other suitable power supply (not shown). Preferably, the power supply is disposed within the protected portion of the container, so the power supply is protected by the tamper detection system. A reduced light signal can forewarn of a pending failure of the power supply or attempt at defeating the tamper detection system. If power is lost, an appropriate fail/safe alarm signal can be sent.

Alternatively, rather than continuously illuminating the optical fiber 106, the detector circuit 204 can control the light source 200 to provide modulated or intermittent, for example pulsed, illumination to the optical fiber 106. In this case, if the light detector 202 ceases to detect illumination having a corresponding modulation or intermittent character, or if the light detector detects light having a different modulation or a different intermittent character, the detector circuit 204 can trigger the alarm. Such non-continuous illumination can be used to thwart a perpetrator who attempts to defeat the tamper detection system by illuminating the optical fiber with a counterfeit light source.

The detector circuit 204 can be connected to an alarm 206 located within the container 100, on the exterior of the container, or elsewhere. The alarm 206 can be, for example, a light, horn, annunciator, display panel, computer or other indicator or a signal sent over a network, such as the Internet. Optionally, the detector circuit 204 can be connected to a global positioning system (GPS) 208 or other location determining system. If so connected, the detector circuit 204 can ascertain and store geographic location, and optionally time, information when it detects a breach or radiation or periodically. The detector circuit 204 can include a memory (not shown) for storing this information. The detector circuit 204 can also include an interface 209, such as a keypad, ID badge reader, bar code scanner or a wired or wireless link to a shipping company's operations computer, by which information concerning the cargo of the container 100 can be entered. This information can include, for example, a log of the contents of the container 100 and the locations of the container, when these contents were loaded or unloaded. This information can also include identities of persons who had access to the interior of the container 100. Such information can be stored in the memory and provided to other systems, as described below.

Optionally or in addition, the detector circuit 204 can be connected to a transmitter 210, which sends a signal to a receiver 212 if the detector circuit detects a change in the optical characteristic of the optical fiber 106. An antenna, such as a flat coil antenna 114 (FIG. 1) mounted on the exterior of the container 100, can be used to radiate the signal sent by the transmitter 210. The receiver 212 can be located in a central location or elsewhere. In one embodiment illustrated in FIG. 3, the container 100 is on board a ship 300, and the receiver 212 is located in a control room 302 of the ship.

Returning to FIG. 2, the receiver 212 can be connected to an alarm 214 (as described above) located in a central location, such as the ship's control room 302, or elsewhere.

Some ships are equipped with automatic wireless port notification systems, such as the Automatic Identification System (AIS), that notify a port when such a ship approaches the port. Such a system typically includes an on-board port notification system transmitter 216 and a receiver 218 that is typically located in a port. The present invention can utilize such a port notification system, or a modification thereof, to alert port officials of a breached container or a container in or near which radiation has been detected and optionally of pertinent information concerning the container, such as its contents, prior locations, times of loading/unloading, etc. The receiver 212 can store information it has received from the transmitter 210 about any containers that have been breached in transit or in which radiation has been detected. This information can include, for example, an identity of the container, the time and location when and where the breach occurred or radiation was detected, etc. The receiver 212 can be connected to the port notification transmitter 216, by which it can forward this information to the port at an appropriate time or to a terrorism monitoring system in real time. Other communication systems, such as satellite communication systems or the Internet, can be used to forward this information, in either real time or batch mode, to other central locations, such as a shipping company's operations center.

Alternatively or in addition, the transmitter 210 can communicate directly with a distant central location, such as the port or the shipping company's operations center. In such cases, a long-range communication system, such as a satellite-based communications system, can be used. In another example, where the container is transported over land or within range of cellular communication towers, cellular communication systems can be used. Under control of the detector circuit 204, the transmitter 210 can send information, such as the identity of the container and the time and location of a breach or radiation detection, to the central location. Optionally, the transmitter 210 can send messages even if no breach or radiation has been detected. For example, the detector circuit 204 can test and monitor the operational status of the tamper detection system. These "heart beat" messages can indicate, for example, the location and status of the tamper detection system, such as condition of its battery or status of an alternate power supply, such as remaining life of a fuel cell, or location of the container. Such periodic messages, if properly received, verify that components external to the container, such as the antenna 114, have not been disabled.

As noted above, and as shown in FIG. 4, several liner sheets, examples of which are shown at 400 and 402, can be connected together to monitor several interior surfaces of a container or to monitor a large area of a single surface. These liner sheets 400402 preferably include optical connectors 404, 406, 408, and 410. Optical paths, for example those shown at 412 and 414, defined by the liner sheets 400-402 can be connected together and to the detector circuit 204 and its associated components (shown collectively in a housing 416) via the optical connectors 404-410. Optical fiber "extension cords" 418 and 420 can be used, as needed. If the optical paths 412-414 were connected together in series, a breach of any liner sheet 400 or 402 would trigger an alarm.

The intensity of the input light and the sensitivity of the detector can be such that no amplifiers or repeaters are necessary along the optical path for a simple yes/no determination of breach of the container. This is analogous to the use of an electrical fuse to detect a current overload, without determining the cause of the overload. Alternatively, each panel or a group of panels can have a respective optical path and associated light source and detector, such that a breach of the optical path of the container panels can be identified with a particular panel or side of the container.

Figure 5:
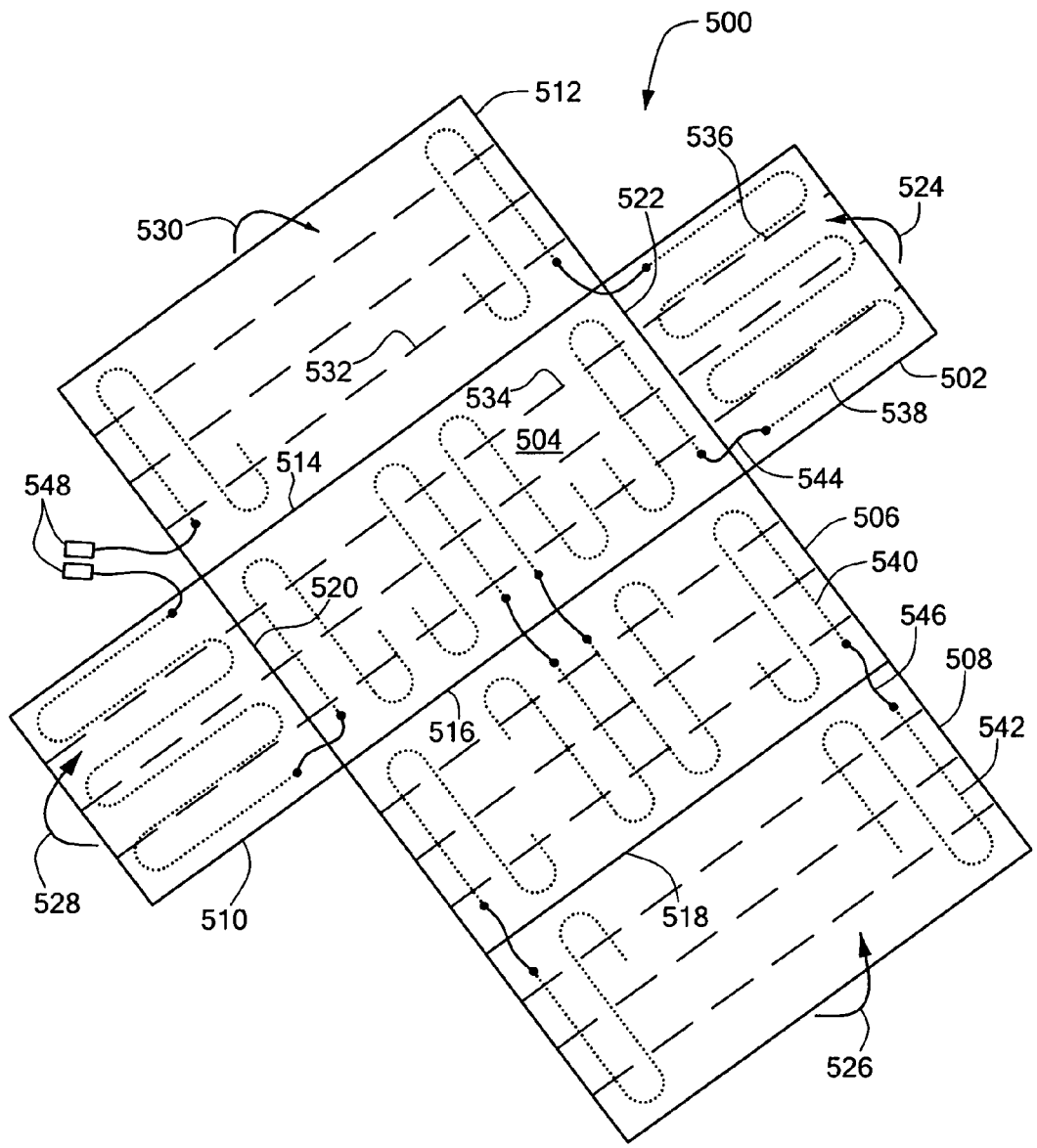
FIG. 5 is a perspective view of a six-panel, hinged liner sheet, according to another embodiment of the present invention.

In another embodiment illustrated in FIG. 5, a single liner sheet 500 can include several hinged panels 502, 504, 506, 508, 510, and 512. The panels 502-512 can be folded along hinges 514, 516, 518, 520, and 522 (as indicated by arrows 524, 526, 528, and 530) to form a three-dimensional liner for a container. Once folded, the liner sheet 500 can, but need not, be self-supporting and thus need not necessarily be attached to the interior surfaces of the container. For example, hinged panel 512 (which corresponds to a side of the container) can attach to hinged panel 508 (which corresponds to a ceiling of the container) by fasteners (not shown) mounted proximate the respective edges of these panels. Similarly, hinged panels 502 and 510 (which correspond to ends of the container) can attach to hinged panels 506, 508, and 512.

Preferably, the hinged panels 502-512 are each sized according to an interior surface of a container, although the panels can be of other sizes. Before or after use, the liner sheet 500 can be unfolded and stored flat. Optionally, the liner sheet 500 can be folded along additional hinges (such as those indicated by dashed lines 532, 534, and 536) for storage. These additional hinges define hinged sub-panels.

As shown, optical fibers in the hinged panels 502-512 (such as those shown at 538, 540, and 542) can be connected together in series by optical jumpers (such as those shown at 544 and 546). A single set of optical connectors 548 can be used to connect the liner sheet 500 to a detector circuit or other panels. Alternatively, additional optical connectors (not shown) can be connected to ones or groups of the optical fibers. The liner sheet 500 has six panels 502-512 to monitor the six interior surfaces of a rectangular container. Other numbers and shapes of panels are acceptable, depending on the interior geometry of a container, the number of surfaces to be monitored, and the portion(s) of these surfaces to be monitored. It is, of course, acceptable to monitor fewer than all the interior surfaces of a container or less than the entire area of any particular surface.

Figure 6:
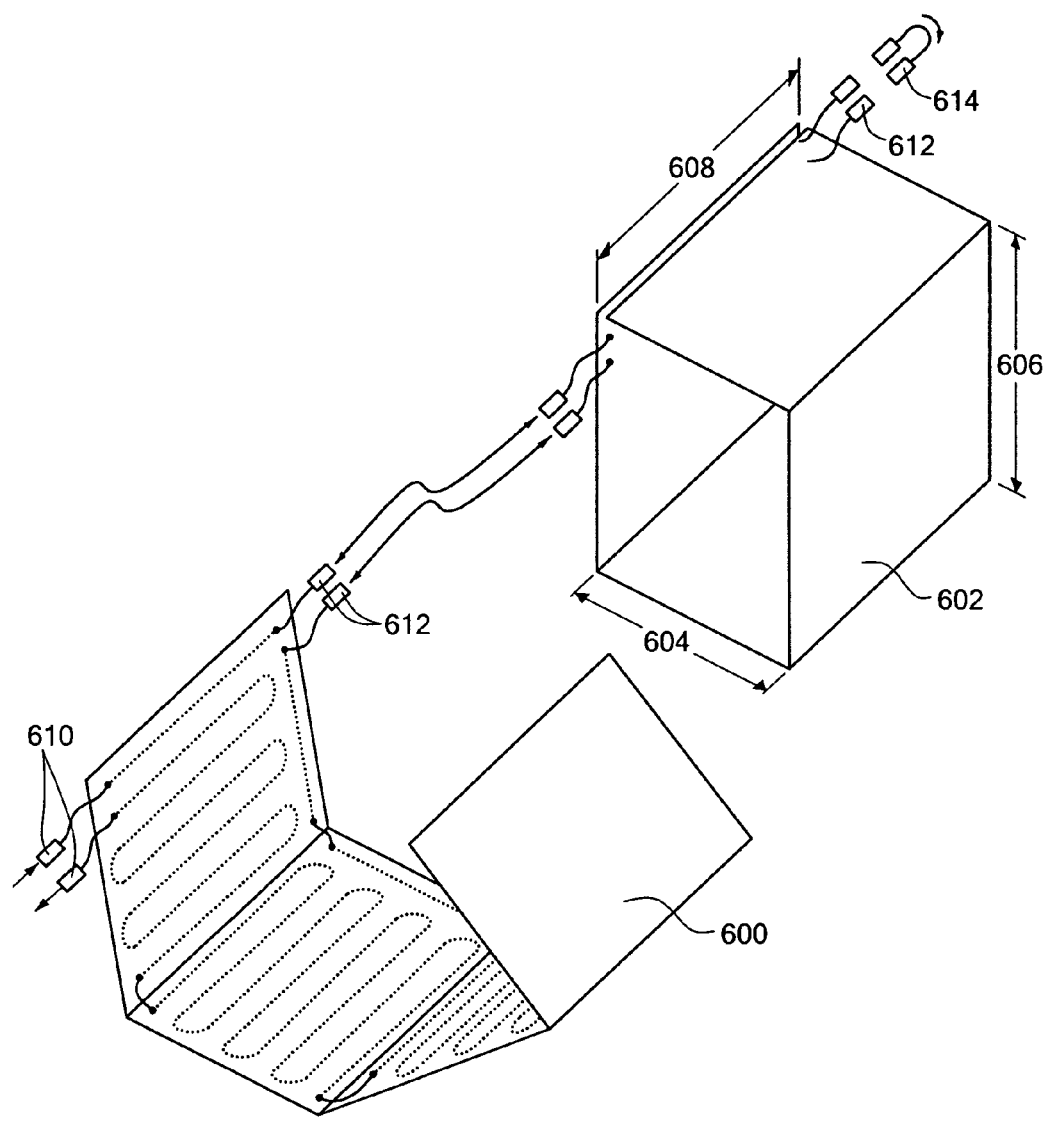
FIG. 6 is a perspective view of two modular liner units, according to another embodiment of the present invention.

As noted, ISO standard containers are available in various lengths. Many of these lengths are multiples of 10 or 20 feet. To avoid stocking liner sheets for each of these container lengths, an alternative embodiment, illustrated in FIG. 6, provides modular liner units, such as those shown at 600 and 602. The modular liner units 600-602 can include four (or another number of) hinged panels, as described above. Preferably, each modular liner unit 600-602 has a width 604 and a height 606 that corresponds to a dimension of a typical container. The length 608 of the modular units is chosen such that a whole number of modular units, placed end to end, can line any of several different size containers. For example, the length can be 9.8 feet or 19.8 feet. Such modular units can be easier to install than a single liner sheet (as shown in FIG. 5), because the modular units are smaller than a single liner sheet.

Each modular liner unit 600-602 preferably includes two sets of optical connectors 610 and 612, by which it can be connected to other modular units or to a detector circuit. A "loop back" optical jumper 614 completes the optical path by connecting to the optical connectors 612 of the last modular unit 602.

Figure 4:
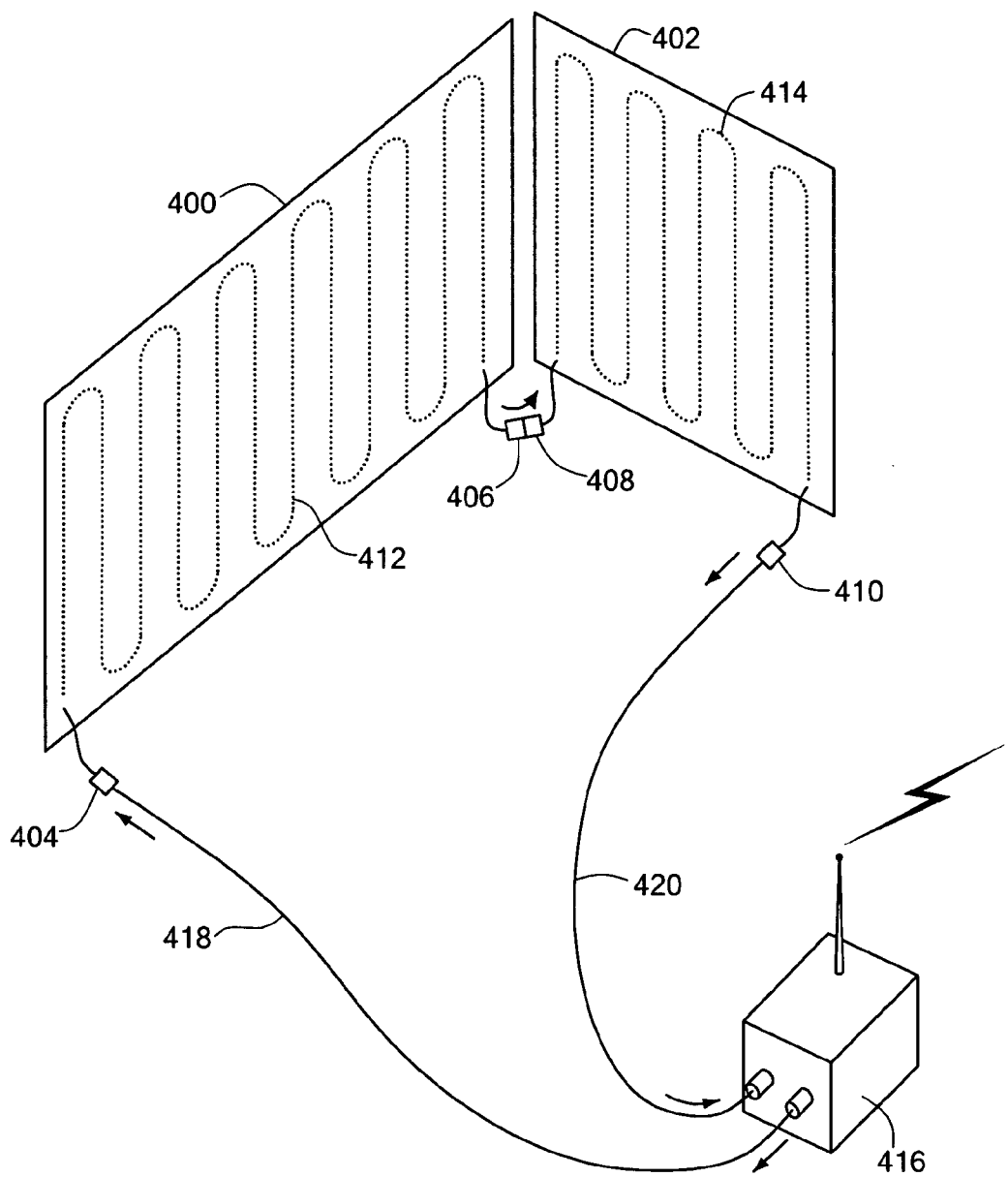
FIG. 4 is a perspective view of two liner sheets connected together, according to another embodiment of the present invention.
Figure 26:
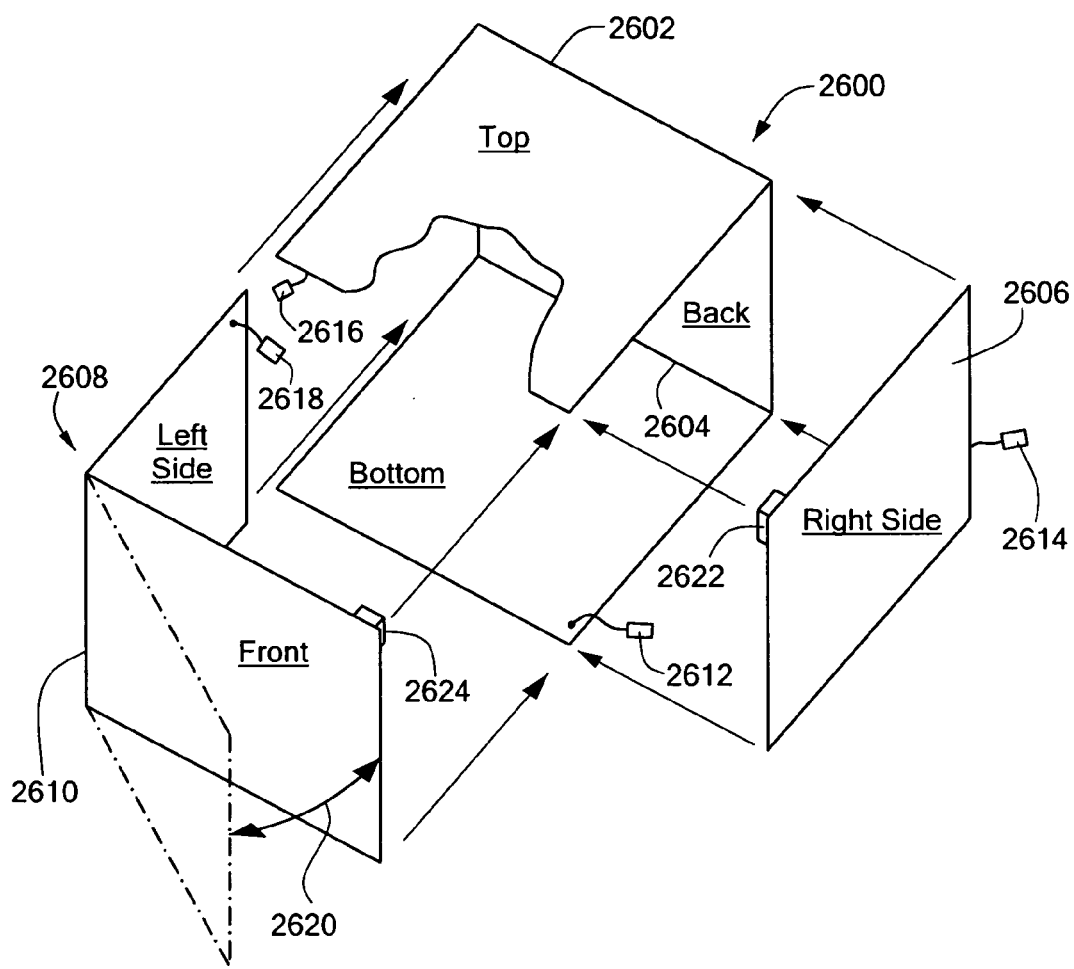
FIG. 26 is an exploded perspective view of a set of liner sheets, according to another embodiment of the present invention.

As noted with respect to FIG. 4, several liner sheets can be connected together to monitor several surfaces or to monitor a large area. Another such embodiment is shown in FIG. 26. In this embodiment, three liner sheets are interconnected to monitor the six interior surfaces of a container. One liner sheet 2600 is folded along two lines 2602 and 2604 to form a U-shaped structure that lines the top, back and bottom of the container. Another liner sheet 2606 lines the right side of the container. A third liner sheet 2608 is folded along a line 2610 to form an L-shaped structure that lines the left side and front of the container.

Optical fibers (not shown) in the first and second liner sheets 2600 and 2606 are interconnected by optical connectors 2612 and 2614. Similarly, optical fibers in the first and third liner sheets 2600 and 2608 are interconnected by optical connectors 2616 and 2618. Optical "extension cords" (not shown) can be used, if necessary.

The fold along line 2610 forms a hinge, so the front portion of the third liner sheet 2608 can pivot about the hinge, as shown by arrow 2620. The front portion of the third liner sheet 2608 therefore acts as a door. The door is opened to load or unload cargo into or out of the container. Once the cargo is loaded or unloaded and the front portion of the third liner sheet 2608 is closed, the door(s) of the container can be closed.

Figure 27:
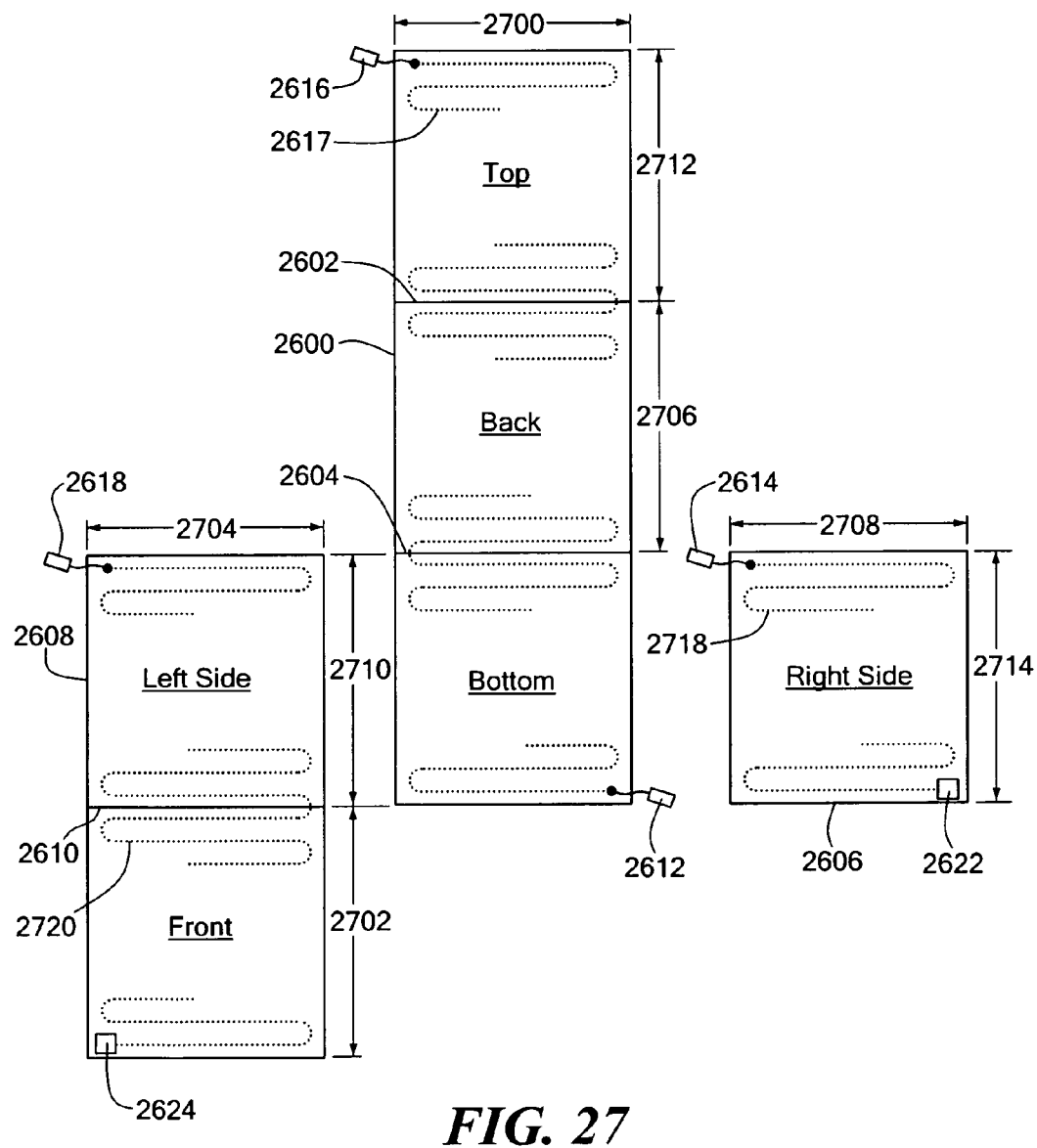
FIG. 27 is a plan view of the liner sheets of FIG. 26 laid flat.

The first, second and third liner sheets 2600, 2606 and 2608 are shown unfolded, i.e. laid out flat, in FIG. 27. The optical fibers are indicated by dotted lines 2716, 2718 and 2720. The dimensions of the liner sheets 2600, 2606 and 2608 can be selected according to the size of the container in which the liner sheets are to be used. For example, if the liner sheets are to be used in a 10 ft. long by 10 ft. wide by 10 ft. high container, each dimension is about 10 ft. or slightly less to accommodate installing the liner sheets in the container. For example, dimensions 2700 and 2702 are each slightly less than 10 ft., according to the width of the container; dimensions 2704, 2706 and 2708 are each slightly less than 10 ft., according to the height of the container; and dimensions 2710, 2712 and 2714 are each slightly less than 10 ft., according to the length of the container.

If the liners sheets 2600, 2606 and 2608 are to be used in a 20 ft. or 40 ft. long container, dimensions 2710, 2712 and 2714 are increased accordingly. Similarly, if the liner sheets are to be used in a shorter, taller, wider or narrower container, the appropriate dimensions are adjusted accordingly.

Figure 29:
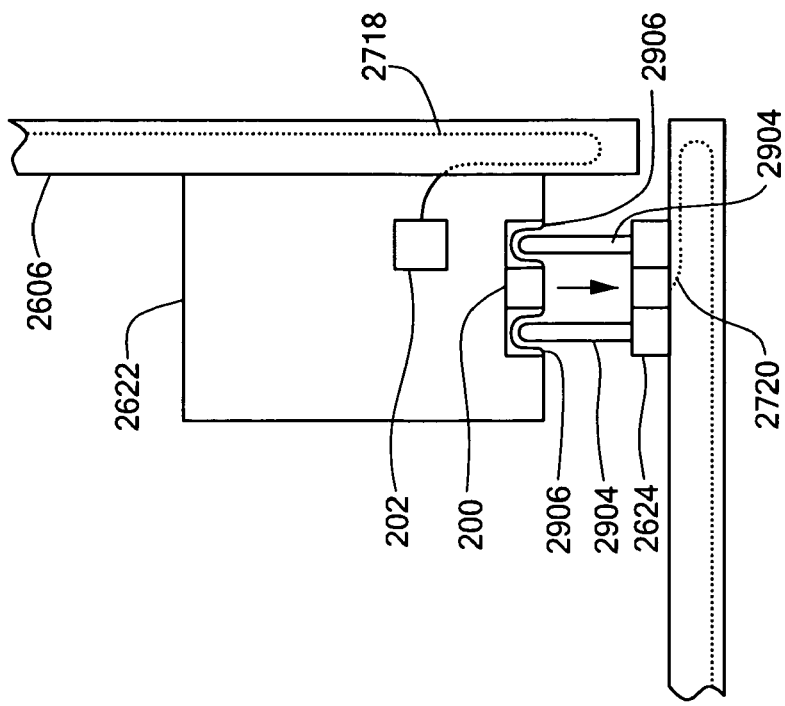
FIG. 29 is an enlarged view of a portion of the top view of FIG. 28.
Figure 28:
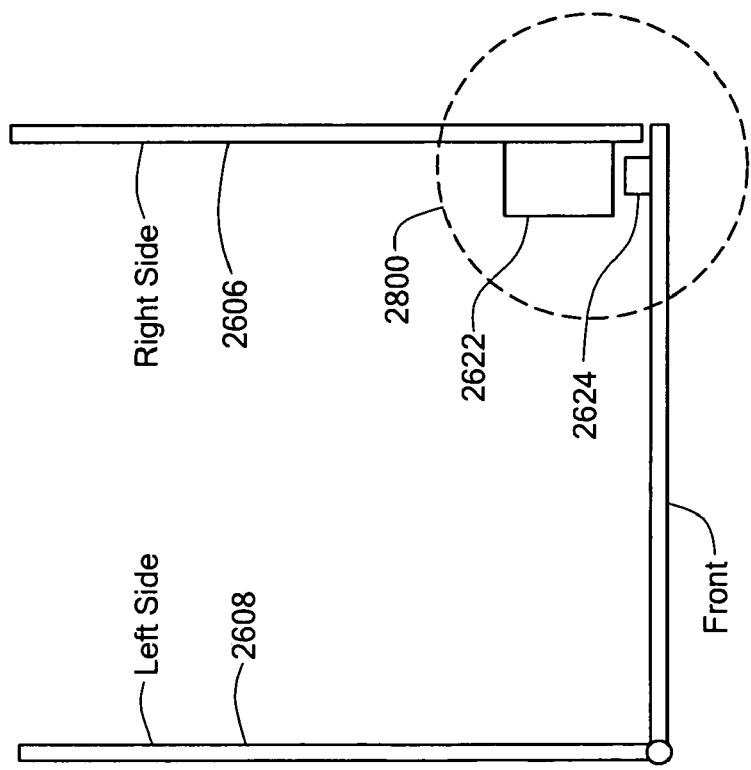
FIG. 28 is a top view of a portion of the liner sheets of FIG. 26.

Returning to FIG. 26, the detector circuit 204 discussed above with reference to FIG. 2 is enclosed in a housing 2622 attached near an upper corner of the right liner sheet 2606. A second housing 2624 is mounted near an upper corner of the front portion (i.e. door) of the liner sheet 2608. FIG. 28 is a top view of the right liner sheet 2606, the front portion of the liner sheet 2608 and the housings 2622 and 2624 mounted thereto. FIG. 29 is an enlarged view of a portion 2800 of FIG. 28. A light detector 202 is coupled to the optical fiber 2718 in the right side liner sheet 2606. A light source 200 in the housing 2622 optically couples with an end of the optical fiber 2720 in the front portion of liner sheet 2608.

When the front portion of liner sheet 2608 (i.e. the door) is closed, the housing 2624 attached thereto aligns the optical fiber 2720 in the front portion of the liner sheet with the light source 200 in the housing 2622 attached to the right side liner sheet 2606, thereby optically coupling the light source 200 with the optical fiber 2720. Alignment pins 2904 projecting from the housing 2624 mate with recesses 2906 in the other housing 2622 to facilitate aligning the light source 200 and the optical fiber 2720. Alternatively, rather than including the alignment pins 2904, the housing 2624 can be cone shaped and configured to mate with a cone shaped recess in the other housing 2622.

Of course, the functions of the light source 200 and the light detector 202 can be interchanged. That is, the light source can be coupled to the optical fiber 2718 in the right side liner sheet 2606, and the light detector can be coupled to the optical fiber 2720 in the front portion of the liner sheet 2608. Other configurations are also possible, as would be evident to those of ordinary skill in the art.

Figure 30:
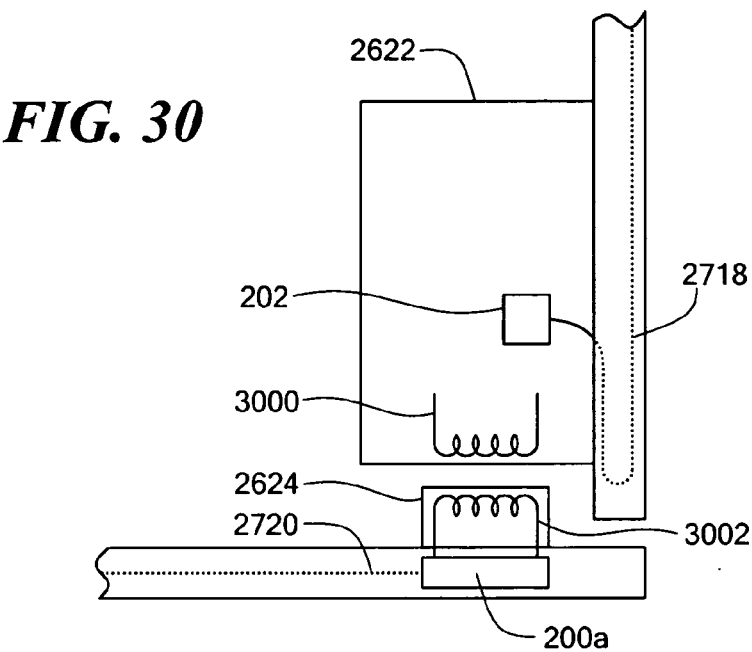
FIG. 30 is a diagram of an alternative embodiment to the one show in FIG. 29.

Alternatively, rather than optically coupling the circuits in the two housings 2622 and 2624, the circuits can be electromagnetically coupled. For example, as shown in FIG. 30, the housing 2622 includes a coil 3000 that electromagnetically couples with a second coil 3002 in the other housing 2624 when the front portion (i.e. door) of the liner sheet 2608 is closed. The first coil 3000 is provided with an AC signal. Due to the proximity of the two coils 3000 and 3002, an AC signal is induced in the second coil 3002, which is connected to a circuit 200*a*. The circuit 200*a* rectifies the received AC signal and drives a light source coupled to the optical fiber 2720.

Figure 32:
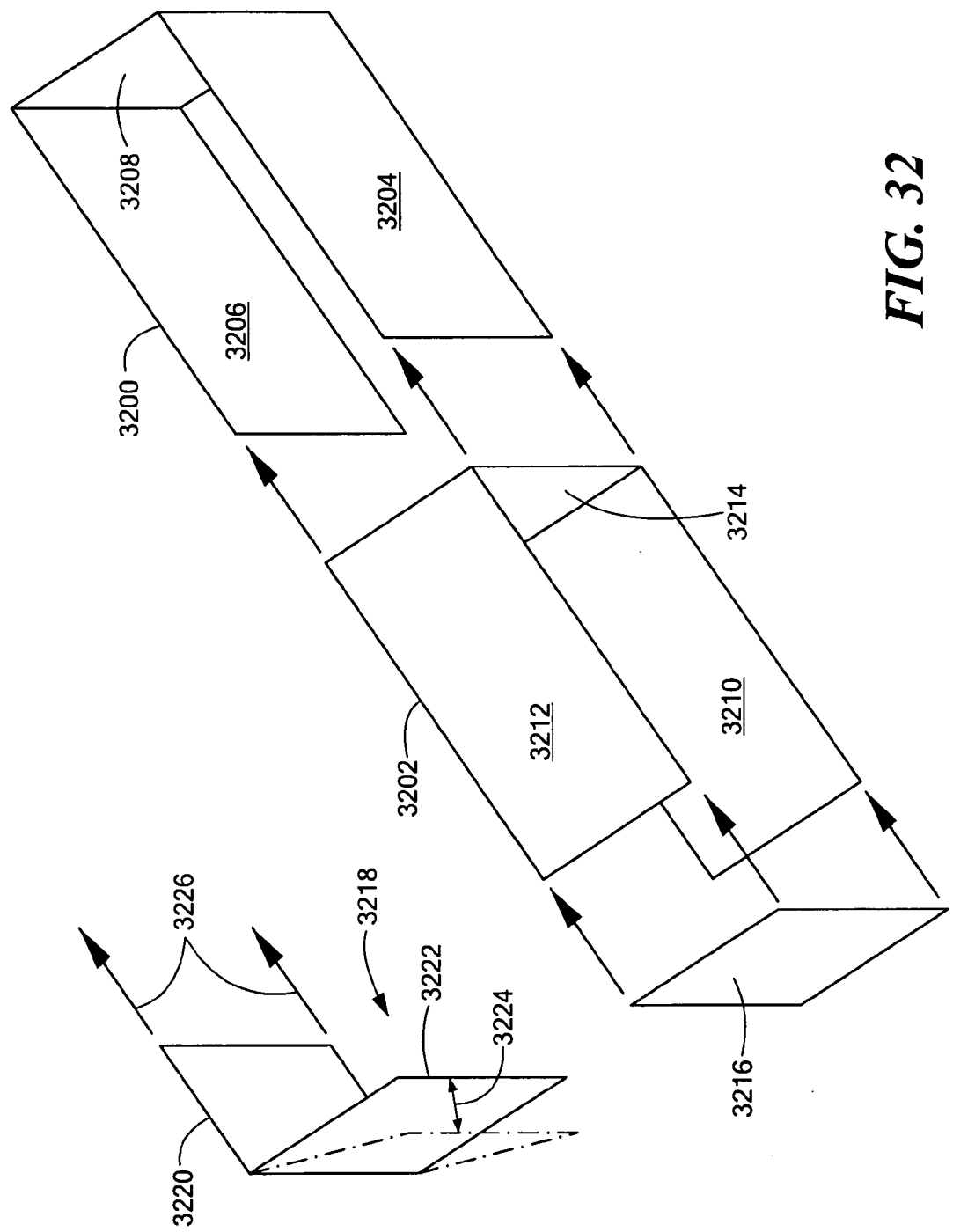
FIG. 32 is a perspective view of a set of liner sheets, according to another embodiment of the present invention.

FIG. 32 shows yet another embodiment in which several liner sheets can be used to monitor several surfaces or to monitor a large area. One liner sheet 3200 forms a U-shaped structure to line the left side, back and right side of a container, while another liner sheet 3202 forms another U-shaped structure to line the top, back and bottom of the container. In this configuration, one of the U-shaped structures 3202 "nests" inside the other U-shaped structure 3200 to bound a rectangular volume on five sides thereof. Each liner sheet 3200 and 3202 includes three sub-panels 3204, 3206 and 3208 and 3210, 3212 and 3214 (respectively) to form a U shape. Note that the back of the container is lined by two different liner sheets 3200 and 3202, specifically, by sub-panels 3208 and 3214. That is, the sub-panels 3208 and 3214 overlap.

A third liner sheet 3216 lines the front of the container. The two liner sheets 3200 and 3202 can, but need not, be identical. Using identical liner sheets 3200 and 3202 is economical because, unlike the embodiment shown in FIG. 26, only two different types of liner sheets, i.e., 3202 and 3204, need to be manufactured.

Optical fibers (not shown) in the liner sheets 3200-3204 can be interconnected or connected to a detector circuit by optical connectors (not shown), as discussed above. Optical "extension cords" (not shown) can be used, if necessary. A detector circuit (not shown) can be included in a housing mounted on the inside of the liner sheet, such as on liner sheet 3202, on under side of sub-panel 3212 or elsewhere, as discussed above. Optionally, the front liner sheet 3216 is optically or electrically connected to the detector circuit and/or the other liner sheets 3200-3202 as discussed above, with respect to FIG. 26.

Optionally, as shown at 3218, the third liner sheet can include two hinged portions 3220 and 3222 that can pivot with respect to each other, as indicated by arrow 3224. One portion 3220 of the third liner sheet 3218 is inserted (as indicated by arrows 3226) into the container, and the hinged portion 3222 acts as a door. The portion 3220 of the third liner sheet 3218 that is inserted into the container can be any length that provides sufficient support for the door portion 3222.

A liner sheet or panel according to the present invention can be implemented in various forms. For example, rigid, semi-rigid and flexible panels have been described above, with respect to FIGS. 1 and 5. Panels can be manufactured from a variety of materials including cardboard, foamboard, plastic, fiberglass or composite materials or woven or non-woven fabric material. The optical fiber can be embedded in the panel or placed on a panel surface and covered with a protective coating or sheet.

Figure 33:
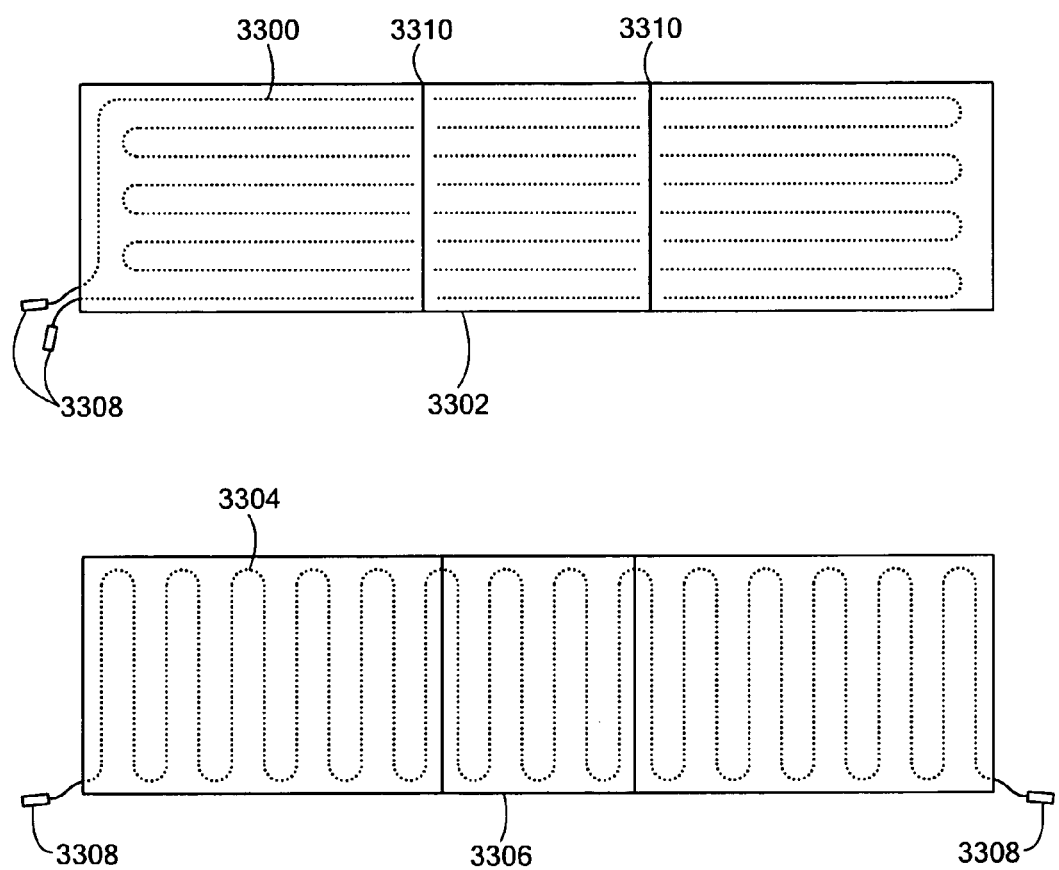
FIG. 33 is a plan view of two different embodiments of one of the liner sheets of the embodiment shown in FIG. 32.

The optical fiber can be disposed in or on a liner sheet in a variety of patterns. For example, as shown in FIG. 33, an optical fiber 3300 can be disposed longitudinally along the length of a liner sheet 3302, or an optical fiber 3304 can be disposed laterally across the width of a liner sheet 3306. Either type of liner sheet 3302 or 3306 can be used in the embodiment shown in FIG. 32. For example, the liner sheet 3302 can be folded alone lines 3310 to form the U-shaped structure described above. FIG. 33 also shows optional optical couplers 3308.

Figure 7:
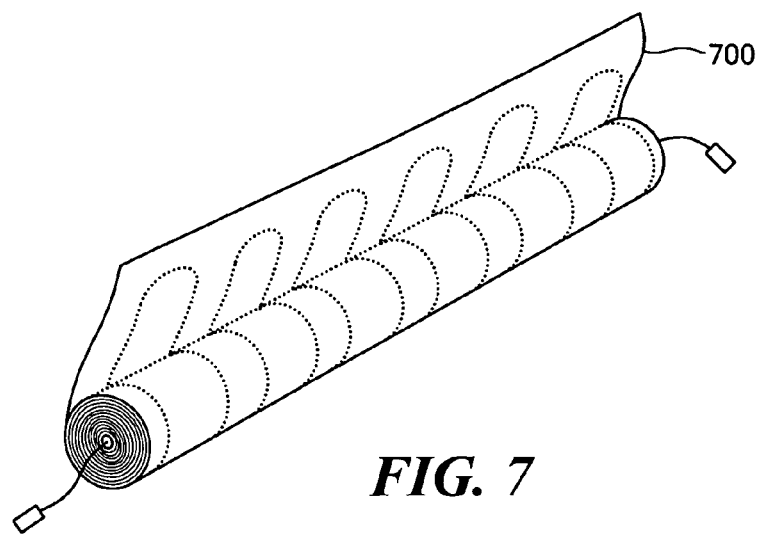
FIG. 7 is a perspective view of a flexible, rollable liner sheet, according to another embodiment of the present invention.

FIG. 7 illustrates another embodiment, in which a liner sheet 700 is made of a flexible, rollable material. The liner sheet 700 can be unrolled prior to installation in a container and later re-rolled for storage. Such a flexible liner sheet can be attached and connected as described above, with respect to rigid panels.

Figure 8:
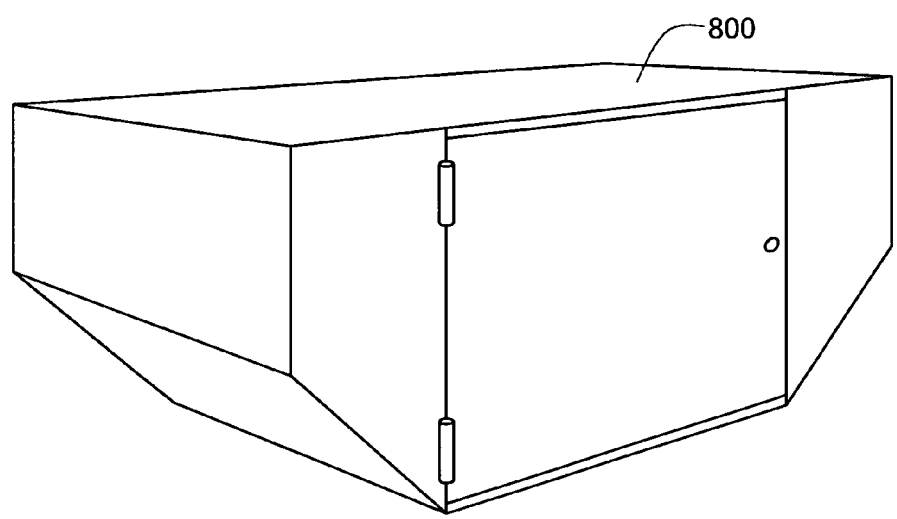
FIG. 8 is a perspective view of an aircraft container, in which an embodiment of the present invention can be advantageously practiced.

Although the present invention has thus far been described for use in ISO and other similar shipping containers, other embodiments can be used in other types of shipping containers or boxes. For example, FIG. 8 illustrates an LD3 container 300 typically used on some aircraft. Embodiments of the present invention can be sized and shaped for use in LD3, LD3 half size, LD2 or other size and shape aircraft containers or containers used on other types of transport vehicles or craft.

Figure 9:
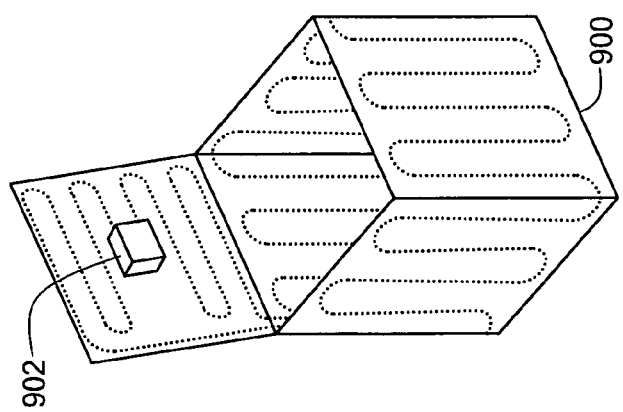
FIG. 9 is a perspective view of a box liner, according to another embodiment of the present invention.

Yet other embodiments of the present invention can be used in shipping boxes, such as those used to ship goods via Parcel Post® service. For example, FIG. 9 illustrates a liner sheet 900 that can be placed inside a box. The liner 900 can include a control circuit 902 that includes the detector circuit 204 (FIG. 2) and the associated other circuits described above. Such a liner sheet need not necessarily be attached to the interior surfaces of a box. The liner sheet 900 can be merely placed inside the box. Optionally, the control circuit 902 can include a data recorder to record, for example, a time and location of a detected breach. The control unit 902 can also include a transmitter, by which it can notify a central location, such as a shipper's operations center of its location and its breach and radiation status.

Furthermore, as noted, embodiments of the present invention are not limited to rectangular containers, nor are they limited to containers with flat surfaces. For example, liner sheets can be bent, curved, shaped or stretched to conform to a surface, such as a curved surface, of a container. In addition, liner sheets need not line all the interior surfaces of a container.

Figure 34:
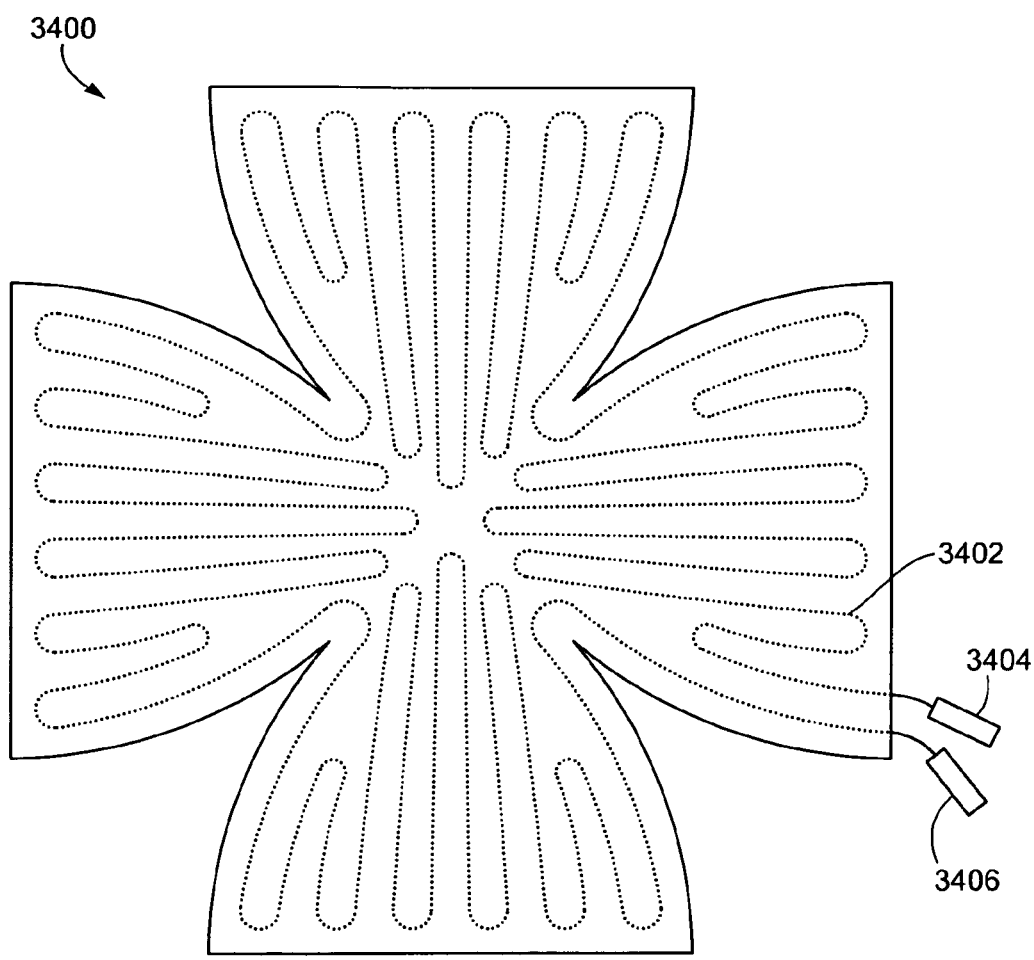
FIG. 34 is a plan view of a membrane according to another embodiment of the present invention.
Figure 35:
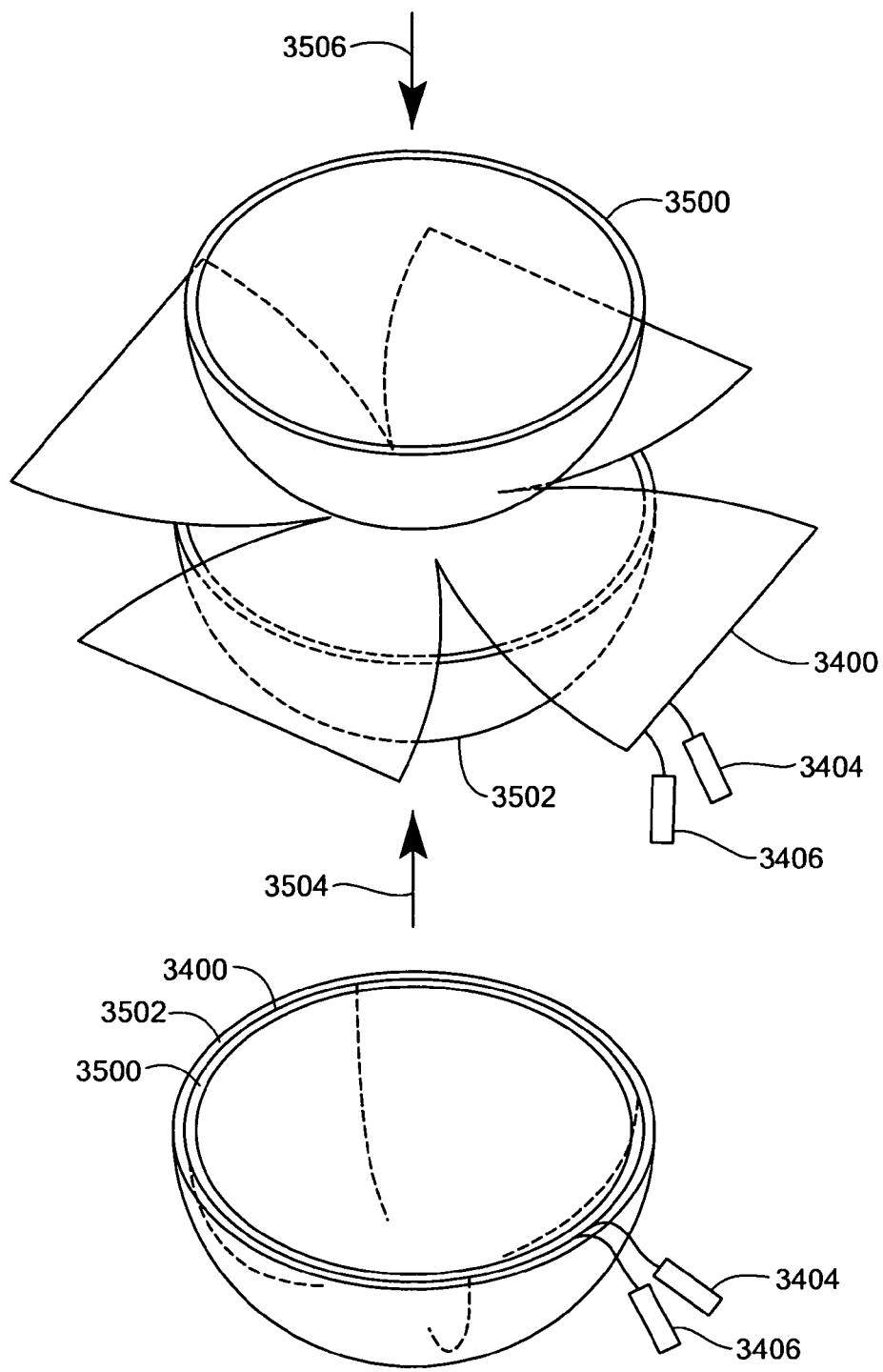
FIG. 35 is an exploded and assembled view of an embodiment using the membrane of FIG. 34.

The liner sheet can be shaped according to the shape of a projection of a curved surface, such as a hemisphere, onto a plane. As shown in FIG. 34, one embodiment includes a membrane 3400 shaped somewhat like a clover leaf with truncated leaves. The membrane 3400 includes one or more optical fibers 3402 and optional optical couplers 3404 and 3406. As shown in FIG. 35, the membrane 3400 is sandwiched between two nesting hollow hemispherical shells 3500 and 3502. In this case, the membrane 3400 is thin and flexible. Such a membrane can be made by laminating optical fiber onto a flexible polymer film or between two such films. The membrane 3400 shown in FIG. 35 has four lobes, however other shapes can be used for the membrane, such that when the membrane is sandwiched between two nesting hollow members, the membrane approximately takes on the same shape the members. The members need not be hemispherical.

One of the hemispherical shells 3500 is slightly smaller than the other shell 3502, so the smaller shell 3500 nests in (i.e., fits inside) the larger shell 3502. When the two shells 3500 and 3502 are brought together, as indicated by arrows 3504 and 3506, the membrane 3400 takes on a shape that closely approximates a hemisphere. Once assembled, the shells 3500 and 3502 and the membrane 3400 can be held together by glue or friction or the three components can be heated to bond them together. Once bonded together, the three components form a hemispherical liner sheet or panel.

Two of the hemispherical liner sheets shown in FIG. 35 can be assembled together to create a spherical enclosure. The optical fibers 3402 of the two structures can be connected together in series by the optical couplers 3404 or 3406, or the two optical fibers 3402 can each be connected to a detector circuit (not shown). The optical fibers 3402 can, of course, be connected to each other or to the detector circuit without optical couplers, such as by fusing the optical fibers 3402 together or terminating the optical fibers on a circuit board of the detector circuit.

Figure 36:
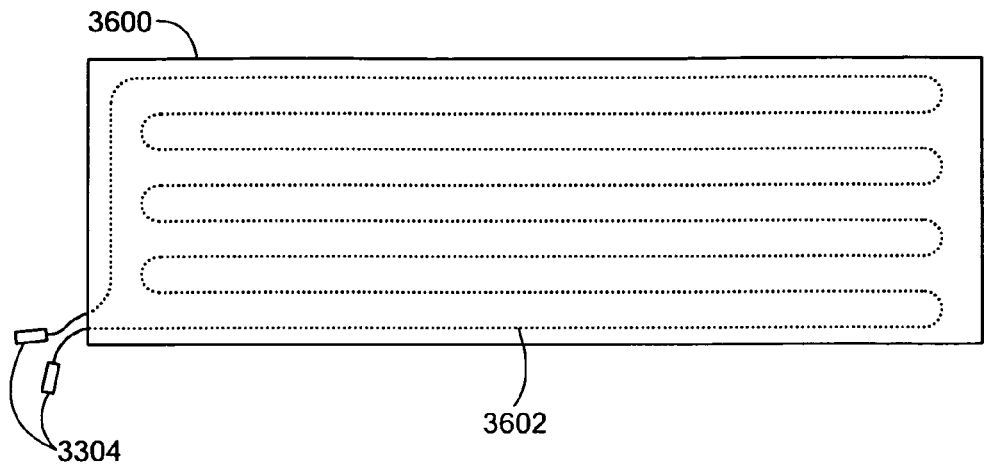
FIG. 36 is a plan view of another membrane according to another embodiment of the present invention.
Figure 37:
FIG. 37 is a schematic diagram of assembling the embodiment with the membrane of FIG. 36.

Other shapes of shells can, of course, be used. For example, as shown in FIG. 36, a thin, flexible membrane 3600 includes (or has attached to it) an optical fiber 3602 and optional optical couplers 3604. As shown in FIG. 37, the membrane 3600 is sandwiched (as indicated by arrows 3700) between two flat rigid panels 3702 and 3704 made of polymer, metal or another suitably rigid material. The membrane 3600 is attached to the panels 3702 and 3704 by an adhesive, thermal melt film, heat and/or pressure.

Figure 38:
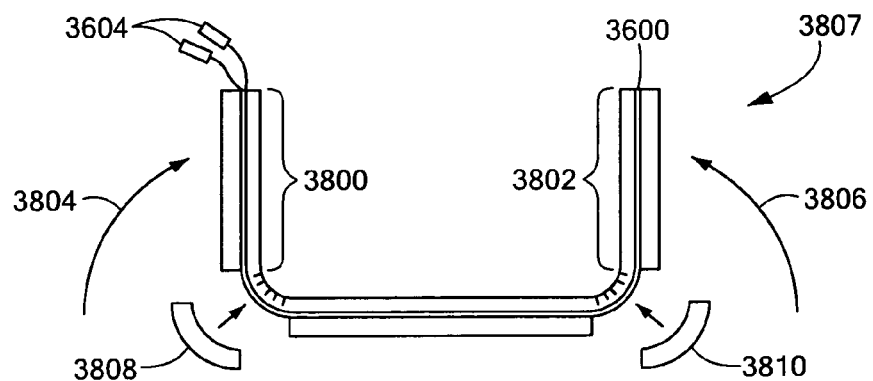
FIG. 38 is a schematic diagram of a further state of assembling the embodiment of FIG. 37.

As shown in FIG. 38, before or after the adhesive cures or the panels 3702-3704 cool, portions 3800 and 3802 are bent, as indicated by arrows 3804 and 3806 to form a three-dimensional, U-shaped structure 3807. Portions 3706 (FIG. 37) of one or both of the panels 3702 and 3704 limit the bend radii of the optical fiber in the membrane 3600. Seam elements 3808 and 3810 are installed at the bends, as shown in FIG. 38.

Figure 39:
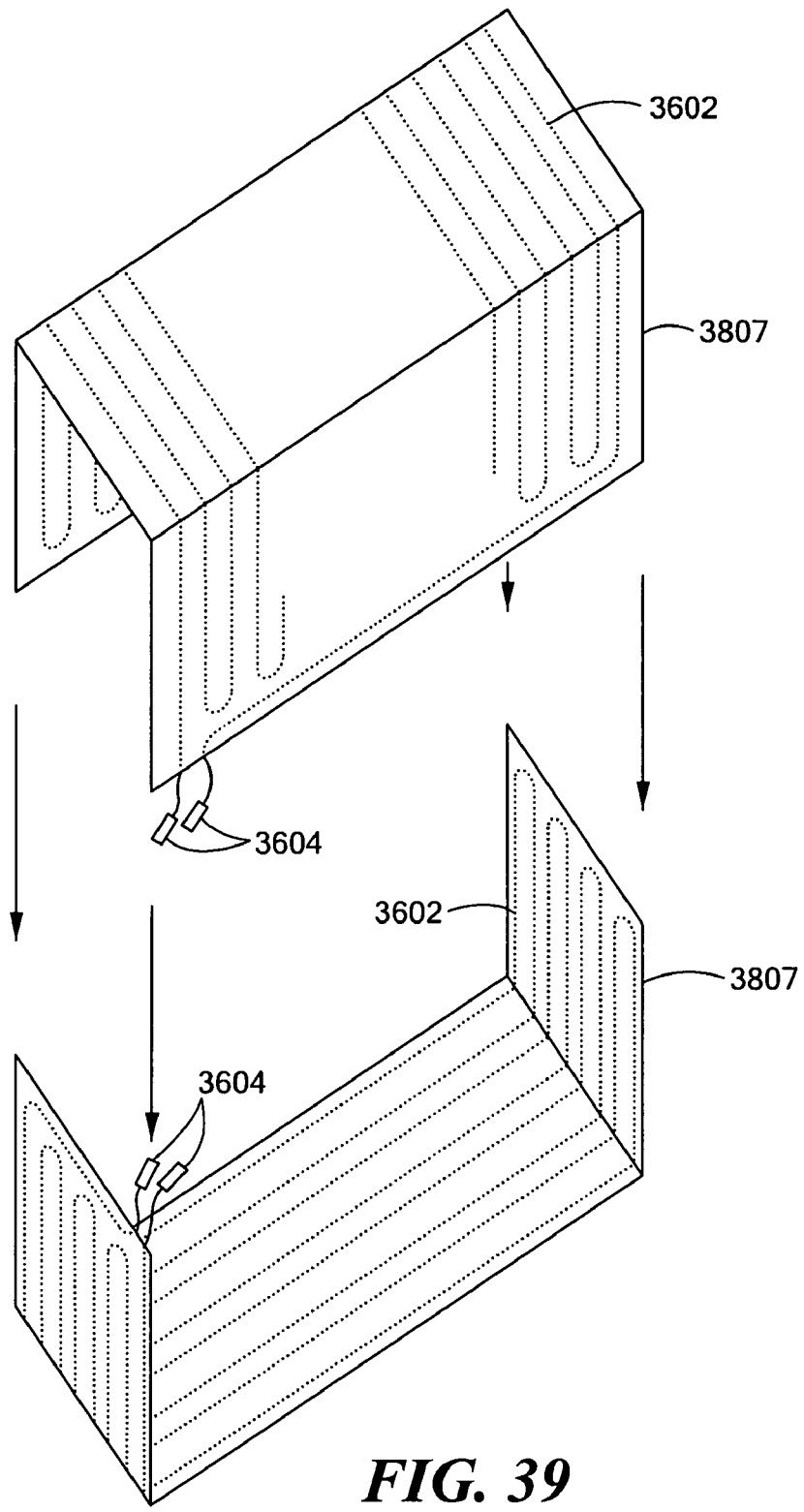
FIG. 39 is a schematic diagram of assembling another embodiment of the present invention.
Figure 43:
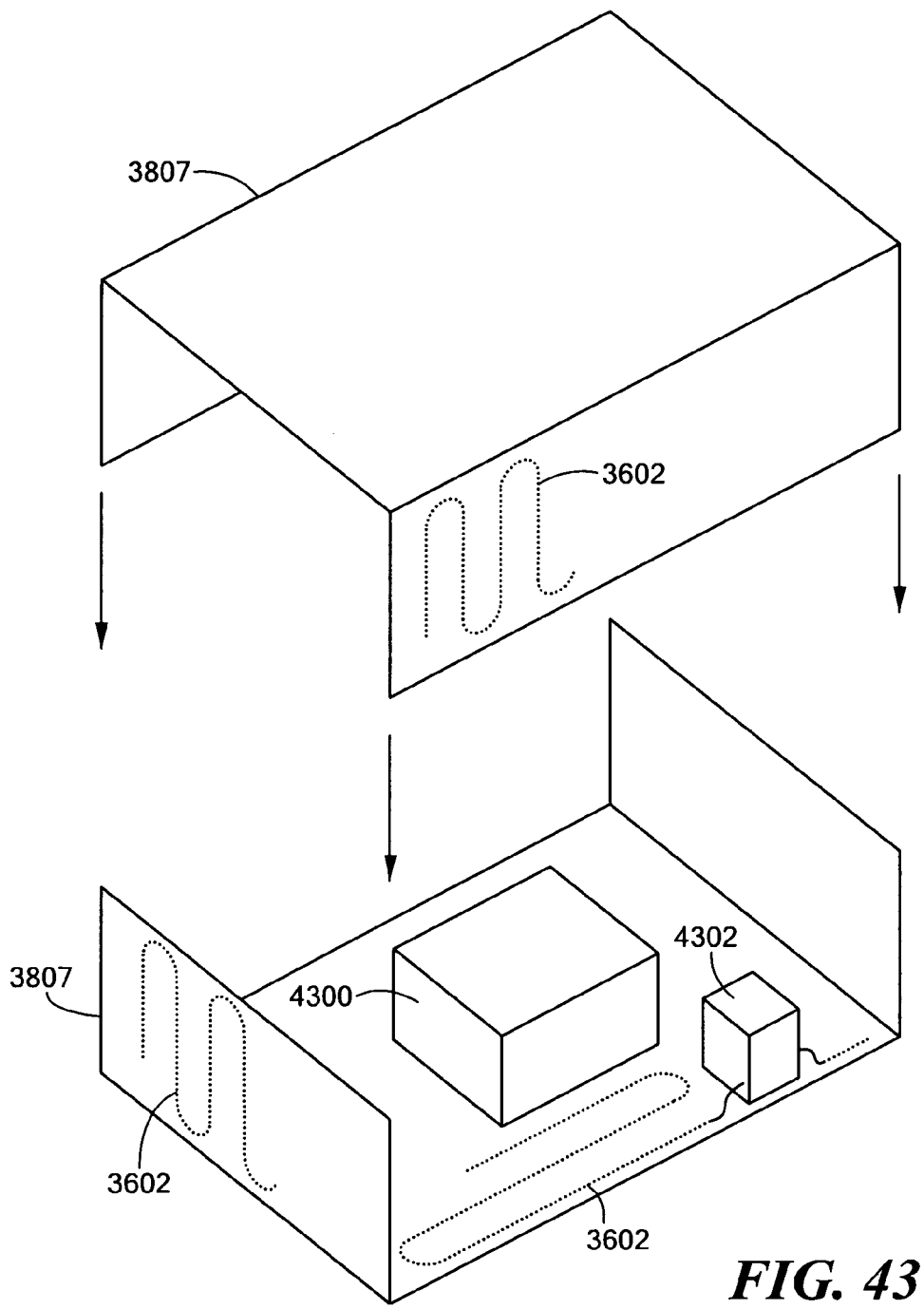
FIG. 43 is a schematic diagram of a self-protective, self-destructive system, according to yet another embodiment of the present invention.

Two of the structures 3807 shown in FIG. 38 are assembled together ("mated") as shown in FIG. 39 to create an enclosure. Such an enclosure, the enclosure formed by assembling together two hemispherical liner sheets or other enclosures formed by assembling two or more liner sheets of other shape(s) can be used to protect sensitive equipment, documents, computer-readable media, etc. For example, as shown in FIG. 43, in a military application, classified weapon systems, reconnaissance equipment, software, data and the like 4300 can be housed in one of the enclosures described above or a similar enclosure. If a military asset, such as a helicopter, is lost or must be abandoned, the detector circuit can detect if the enclosure is breached without first receiving a deactivation signal, such as an encrypted radio-frequency (RF) signal. If so, the detector circuit can trigger a self-destruction circuit 4302, which renders the protected equipment, software or data useless. For example, the software or data can be electronically erased or the equipment or data can be destroyed, such as by an explosive charge. Thus, the enclosure protects the equipment or data from falling into enemy hands, but allows the equipment or data (which may be quite valuable) to await recovery by an ally. Civilian applications are also possible, although self-destruction would be limited to actions that would not be harmful to persons. For example, electronic, magnetic, thermal, etc. self-destruction can be use to render data, electronic equipment, electromechanical equipment, etc. useless.

Figure 40:
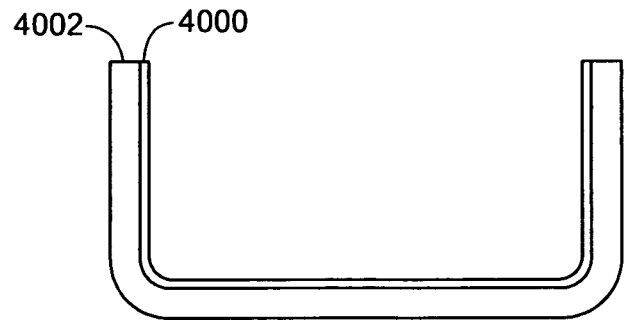
FIG. 40 is a cross-sectional view of yet another embodiment of a liner panel according to the present invention.

Although some of the embodiments have been described as including a flexible membrane or optical fiber sandwiched between two panels, the membrane or optical fiber can be laminated to one surface of a panel, without use of a second panel. For example, as shown in FIG. 40, a membrane 4000 is laminated to a rigid structure 4002, either before or after the rigid structure is formed from a two-dimensional piece. The resulting three-dimensional liner sheet can be used in the military applications described when the equipment or data to be protected is mounted to a sufficiently impenetrable surface. Thus, the three-dimensional liner sheet shown in FIG. 40 is used as a cover, which is securely attached to the impenetrable surface.

Figure 10:
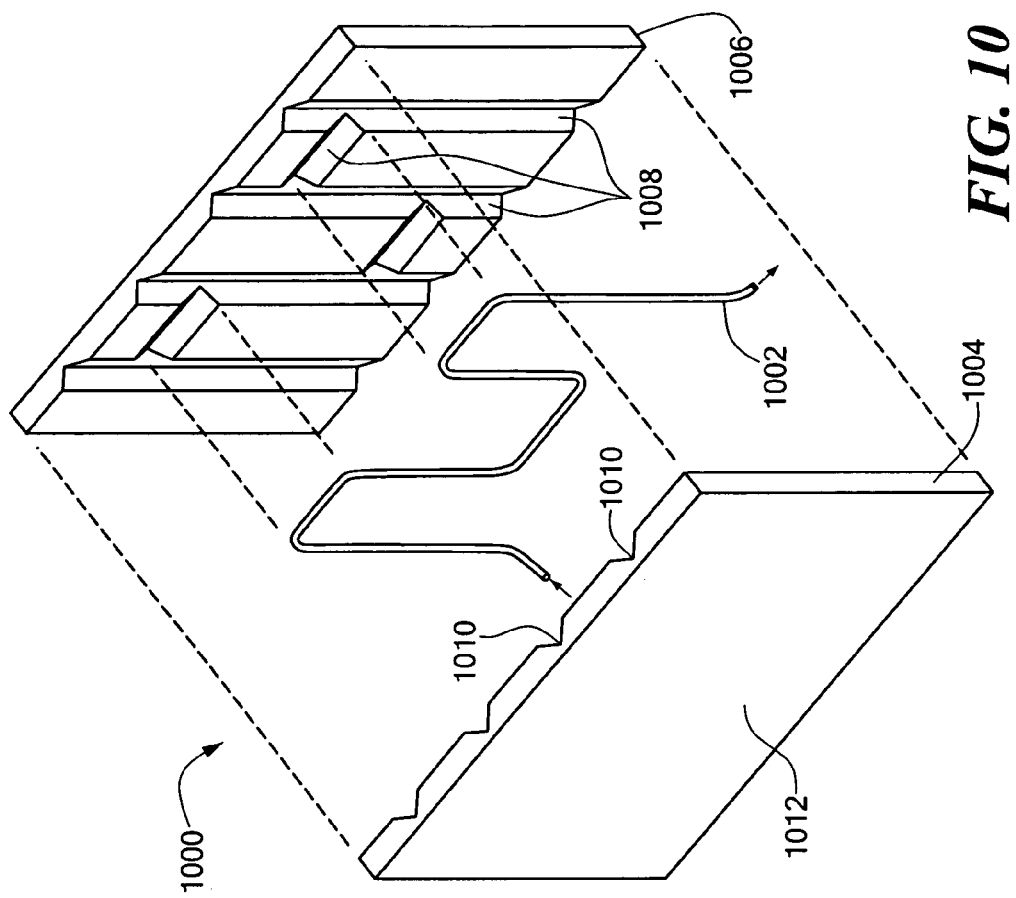
FIG. 10 is an exploded view of a rigid panel, according to one embodiment of the present invention.

As noted, a liner sheet according to the present invention can be implemented in various forms. FIG. 10 is an exploded view of one embodiment of a panel 1000 having an optical fiber 1002 sandwiched between two layers 1004 and 1006. One of the layers 1004 or 1006 can be a substrate, upon which the other layer is overlaid. A groove, such as indicated at 1008, is formed in one of the layers 1006, such as by scoring, cutting, milling, stamping or molding. Optionally, a corresponding groove 1010 is formed in the other layer 1004. The optical fiber 1002 is inserted in the groove(s) 1008(-1010), and the two layers 1004-1006 are joined. Alternatively, the optical fiber can be molded into a panel or sandwiched between two layers while the layers are soft, such as before they are fully cured. Optionally, a surface (for example surface 1012) of one of the layers can be made of a stronger material, or it can be treated to become stronger, than the rest of the panel 1000. Suitable materials for the surfaces include wood, rubber, carpet and industrial fabric or carpet. When the panel 1000 is installed in a container, this surface 1012 can be made to face the interior of the container. Such a surface can better resist impact, and thus accidental damage, from cargo and equipment as the cargo is being loaded or unloaded.

Figure 11:
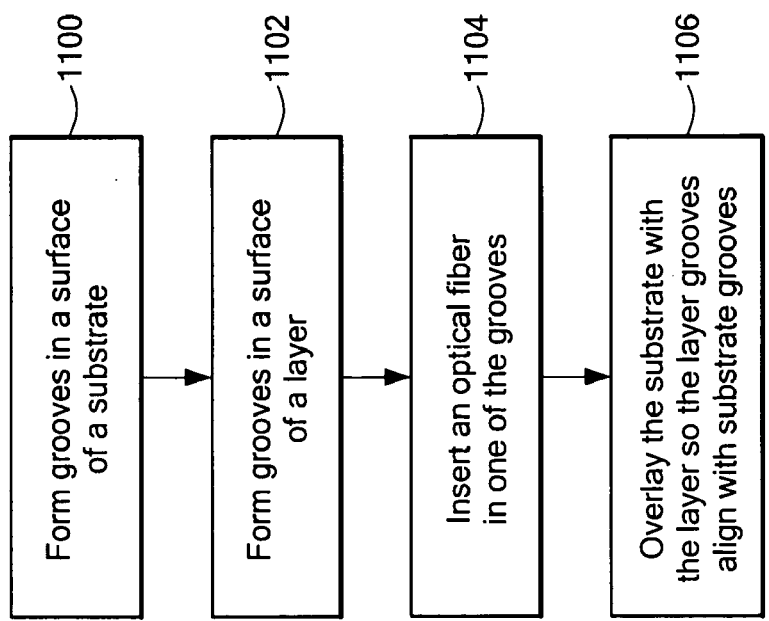
FIG. 11 is a simplified flowchart illustrating a process for fabricating a liner sheet, such as the one illustrated in FIG. 10.

FIG. 11 illustrates a process for fabricating a panel, such as the panel 1000 described above. At 1100, one or more grooves are formed in a substrate. At 1102, one or more grooves are formed in a layer that is to be overlaid on the substrate. At 1104, an optical fiber is inserted in one of the grooves. At 1106, the substrate is overlaid with the layer.

Figure 12:
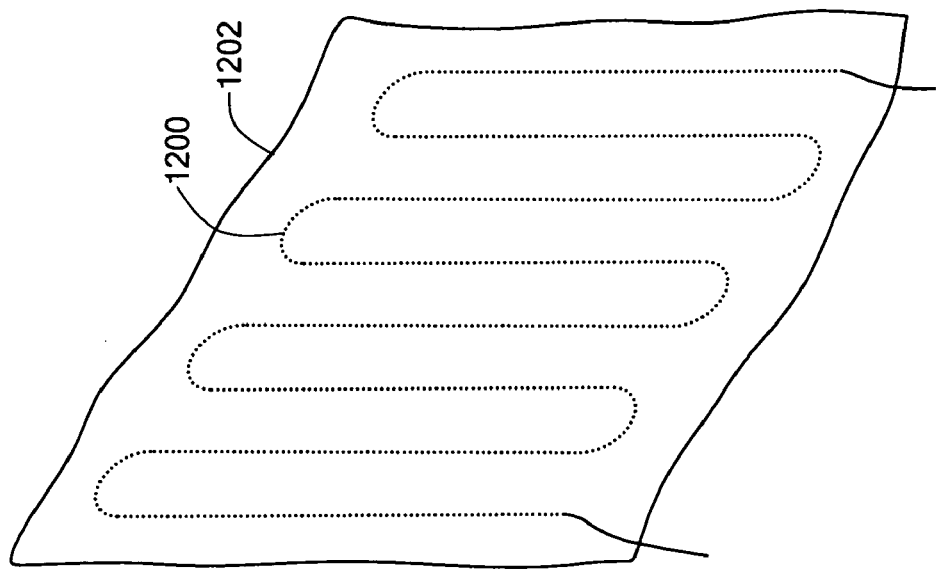
FIG. 12 is a perspective view of a fabric embodiment of a liner sheet, according to one embodiment of the present invention.
Figure 13:
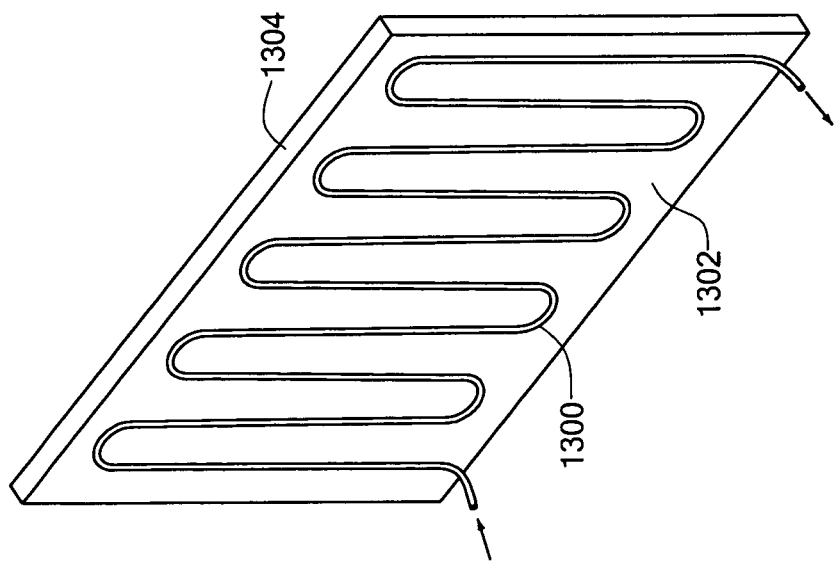
FIG. 13 is a perspective view of a liner sheet panel with an optical fiber attached to its surface, according to one embodiment of the present invention.

Thus far, panels with optical fibers embedded within the panels have been described. Alternatively, as illustrated in FIG. 12, an optical fiber 1200 can be woven into a woven or non-woven (such as spun) fabric 1202. In addition, an optical fiber can be woven or threaded through a blanket, carpet or similar material. As noted above, and as illustrated in FIG. 13, an optical fiber 1300 can be attached to a surface 1302 of a flexible or rigid panel 1304.

Figure 41:
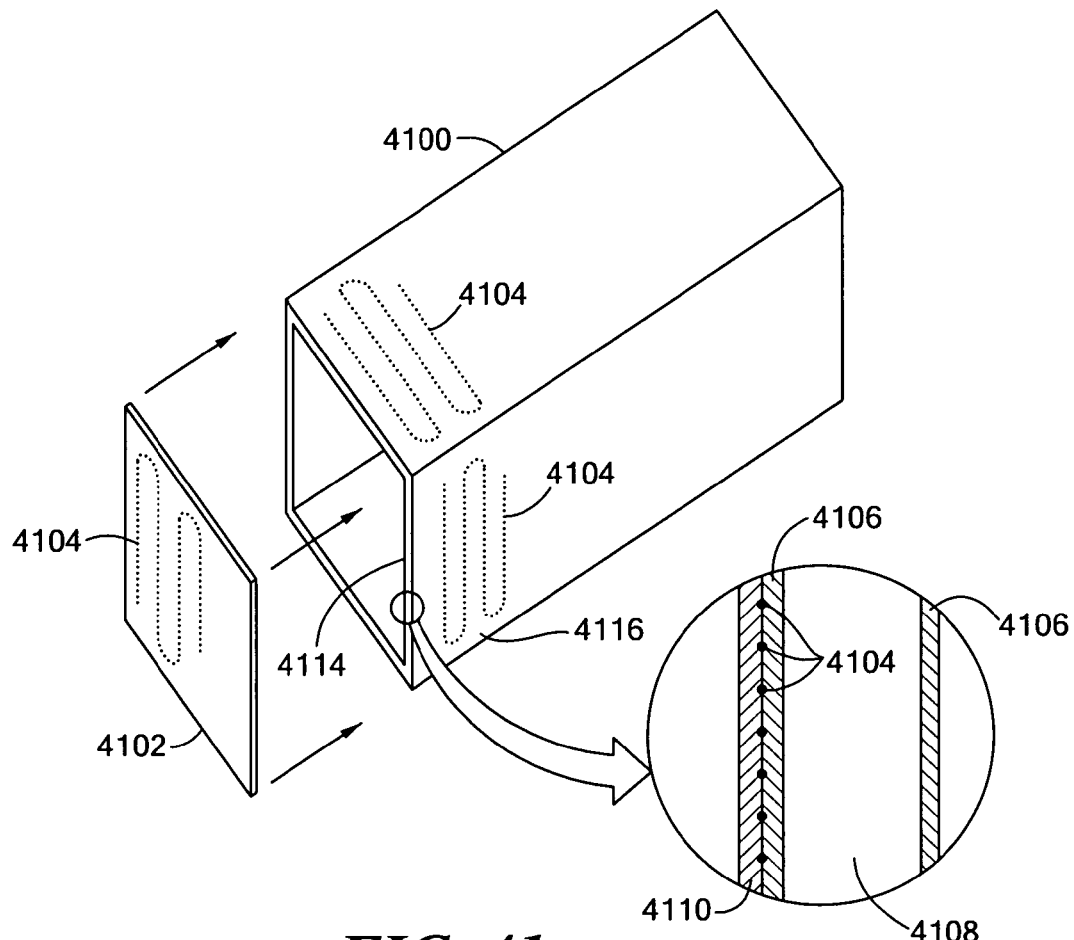
FIG. 41 is a perspective view of an inflatable embodiment of the present invention.

Other possible embodiments include inflatable structures. Each panel or a portion thereof can be a separate inflatable structure. Alternatively, several panels can be formed by a single inflatable structure, as shown in FIG. 41. Inflatable structures are well known. For example, such structures are used to build space-based antennas and other items. These structures are launched in an uninflated, folded and/or rolled configuration and, once in position, they are inflated and take on a desired shape.

An inflatable five-sided (top, bottom, left side, right side and back) body 4100 shown in FIG. 41 is provided in a folded (such as accordion-folded) and/or rolled configuration. Once inserted into a container, the body 4100 is inflated. An exemplary inflation scenario is described below. A separate inflatable door 4102 is then inflated and installed at the opening of the container. The body 4100 and door 4102 include optical fiber 4104, as described elsewhere herein. The body 4100 and door 4102 are interconnected with a light source and detector as described elsewhere herein. Although a two-piece inflatable structure is shown in FIG. 41, the inflatable structure can include other number of pieces. For example, the door 4102 can be hingably attached to the body 4100 and inflated together with, or separate from, the body 4100. In other examples, one or more sides (or portions thereof) of the container are protected by inflatable structures that are interconnected together and/or to the detector circuit.

FIGS. 42*a-i* show a sequence of stages in an exemplary inflation scenario for the body 4100 shown in FIG. 41. Portions of the body 4100 inflate in a predetermined sequence, which can be controlled by an order in which the portions are folded and/or rolled during assembly, an electronic controller, a mechanical controller or some other controller, as is well known in the art.

Figure 42A:
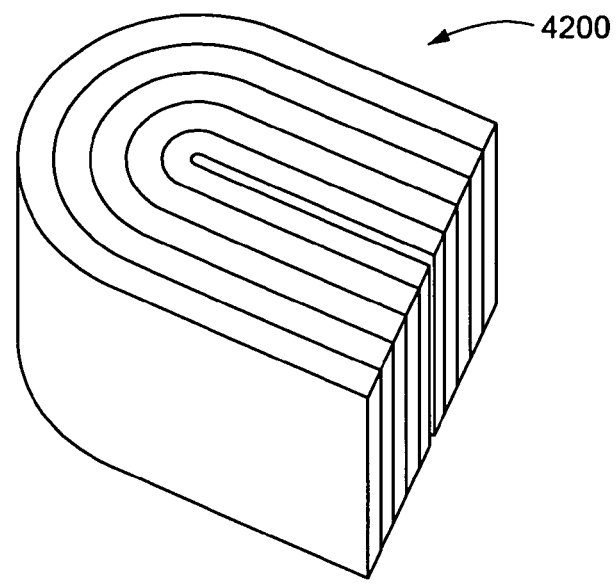
FIGS. 42a-i show a sequence of stages in an exemplary inflation scenario of the embodiment of FIG. 41.
Figure 42B:
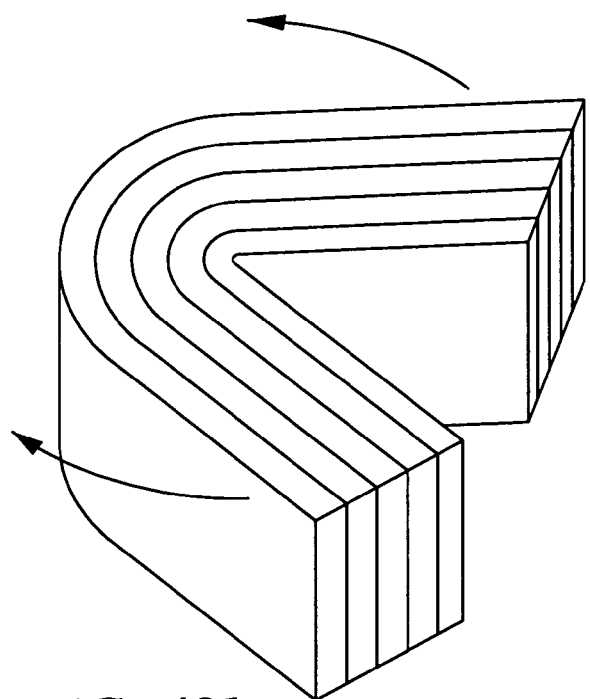
Figure 42C:
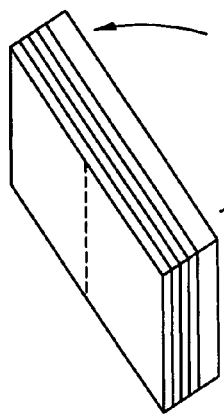
Figure 42D:
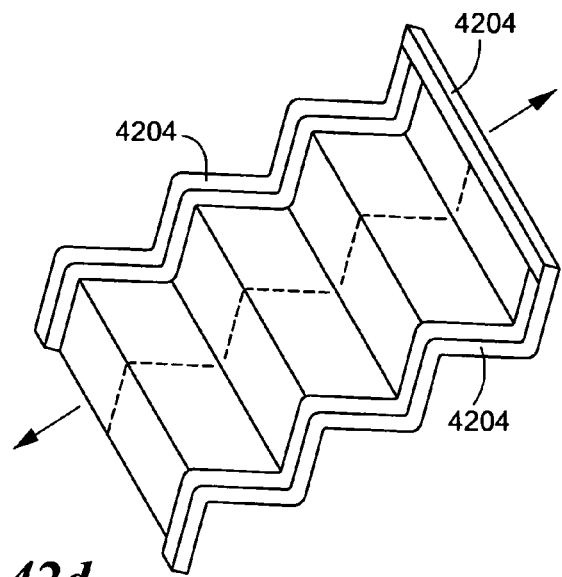
Figure 42E:
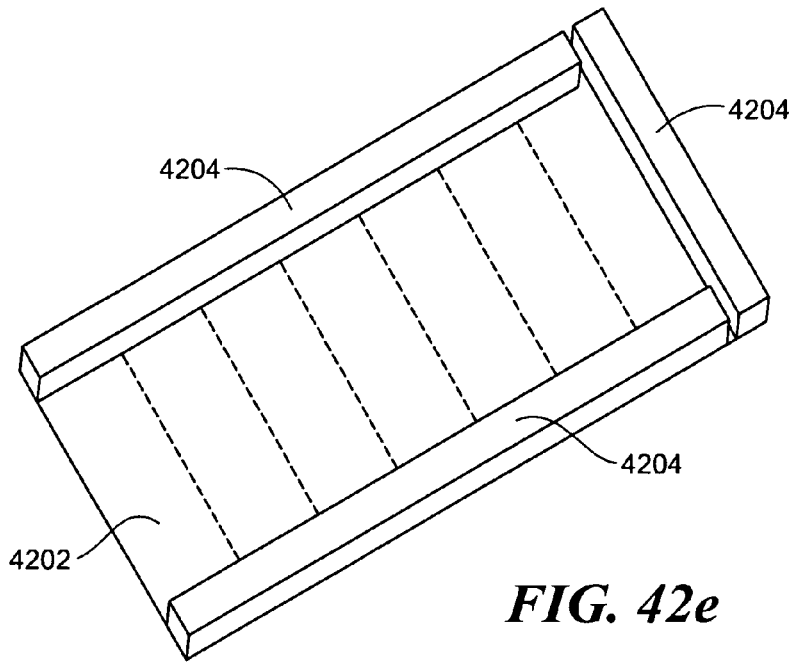

As shown in FIG. 42*a*, a folded and/or rolled body 4200 is disposed within a container (not shown). As the body 4200 is inflated, it begins to unfold, as shown in FIG. 42*b*. An intermediate unfolded stage is shown in FIG. 42*c*. After this intermediate stage is reached, and the body 4100 continues to inflate, it accordion unfolds, as shown in FIG. 42*d* to form the bottom panel 4202, as shown in FIG. 42*e*. Alternatively, the accordion unfolding can overlap other stages of inflation and unfolding or unrolling.

Figure 42F:
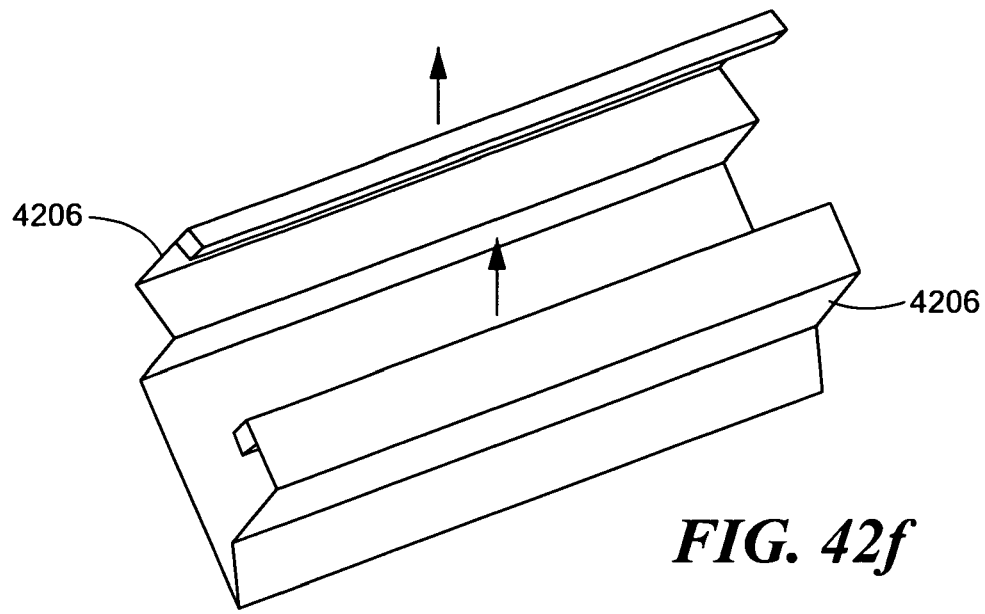
Figure 42G:
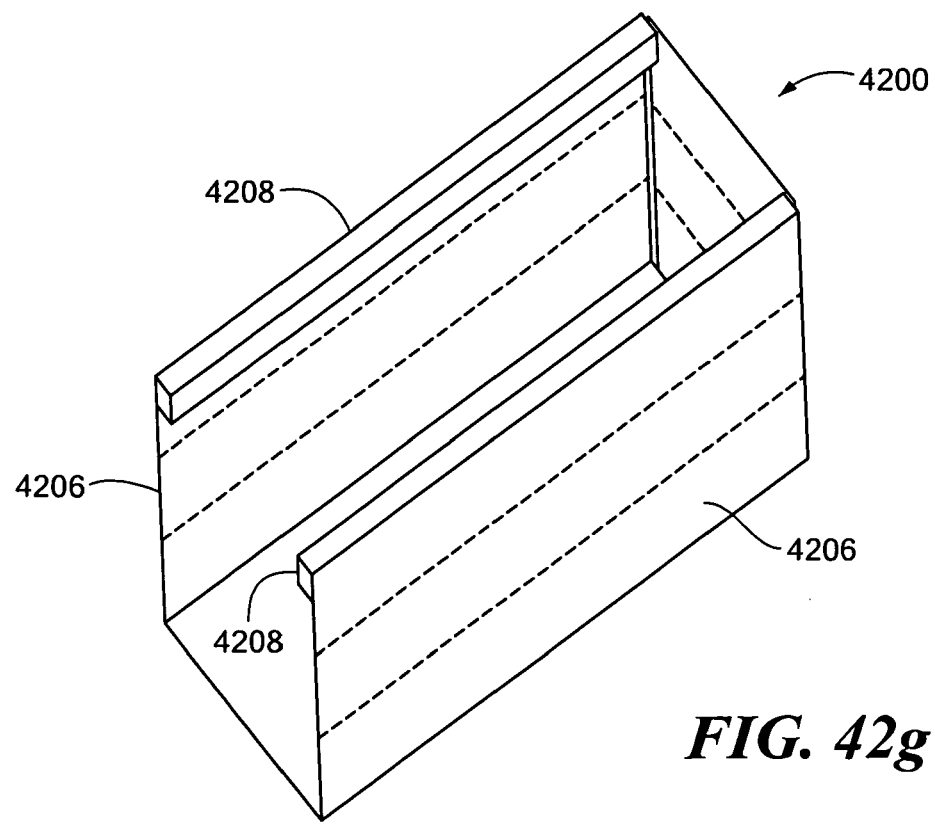
Figure 42H:
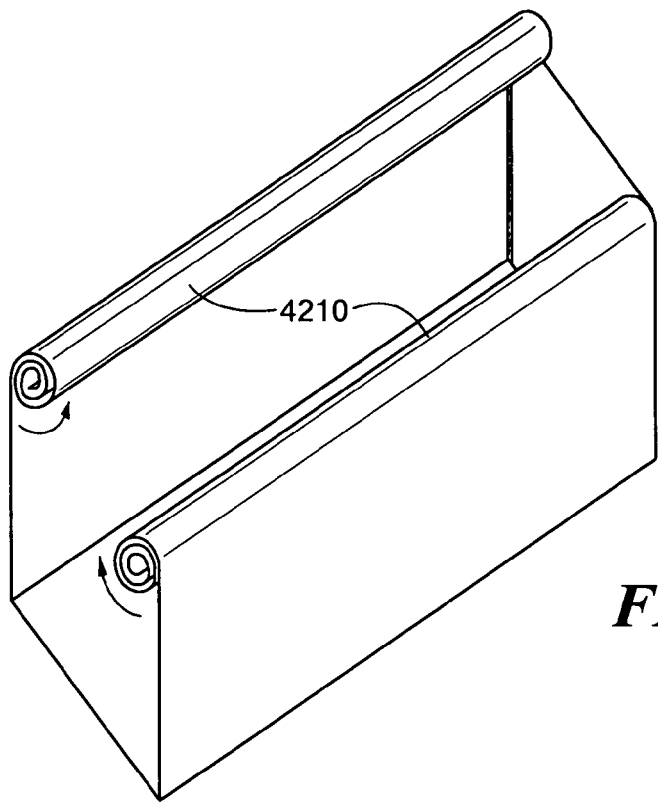
Figure 42I:
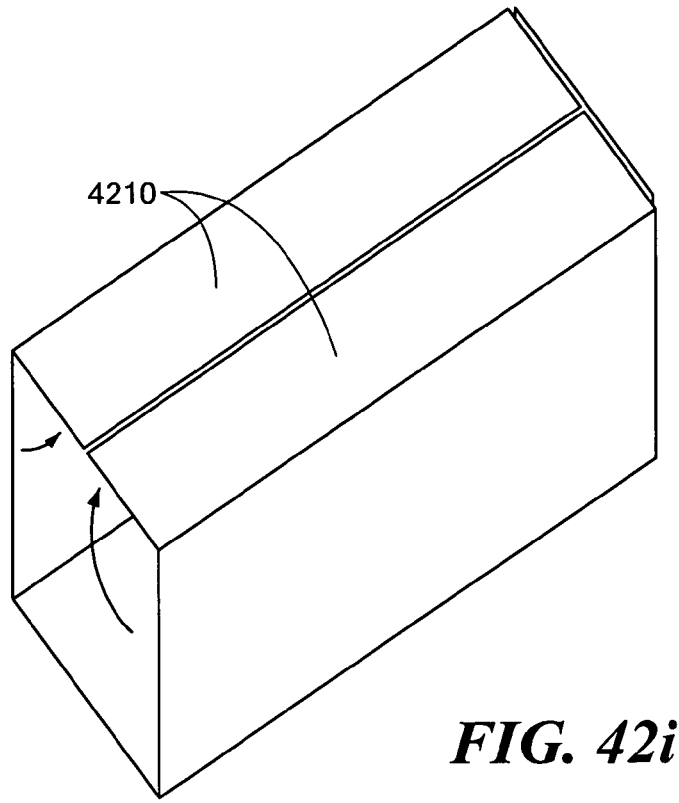

Other still unfolded or unrolled portions of the body 4100 remain in bundles 4204. Alternatively, some or all of these bundles' inflation can overlap the inflation of the bottom panel 4202. In either case, when these bundles 4202 inflate, the sides 4206 accordion unfold, as shown in FIG. 42*f*. (For clarity, FIG. 42*f* omits the back of the body 4100.) FIG. 42*g* shows the body 4200 after the sides 4206 have inflated. Bundles 4208 contain other portions of the body 4100, such as the top 4210. As the body 4200 continues to inflate, the top 4210 unrolls and takes shape, as shown in FIG. 42*h* and ultimately as shown in FIG. 42*i*.

An inflatable structure preferably includes several layers, as shown in the insert in FIG. 41, and becomes rigid after inflation. For example two Mylar layers or metalized nylon layers 4106 define a gas-tight cavity 4108 that can be inflated with any suitable gas. Other inflatable materials, such as plastic, rubber, textile or any material that can hold gas for at least enough time to inflate the structure, can also be used. As described below, the panel can be made rigid after inflation. In this case, the panel need not hold gas after becoming rigid. The gas can be supplied from a compressed gas cylinder, generated by a chemical reaction, such as the reaction used to inflate automobile safety "air bags," or by any other suitable method.

A layer 4110 of reactive polymer or other chemical or material becomes rigid when the structure is inflated, such as due to heat from the inflation gas. Materials that are initially flexible, but become rigid upon curing, are commonly known as "rigidizable" materials. The inflation gas can be heated, if necessary, before inflating the structure. Some chemical reactions generate hot gas. Alternatively, the inflated structure can be heated by an external source, illuminated by an external source (such as a source of ultra-violet light) or sprayed with a reagent that reacts with the layer 4110 to make the layer 4110 rigid.

An optical fiber (as seen in cross section in the insert of FIG. 41) is included in the structure, such as between two of the layers (as shown) or attached to one of the layers (not shown). In one embodiment, light, such as ultra-violet light, escaping through the cladding of the optical fiber causes the layer 4110 to become rigid.

Additional layers (not shown) can be included on the side 4114 of the structure facing the inside of the container and/or on the side 4116 of the structure facing the outside (i.e., the wall, ceiling, floor or door) of the container, as needed, to make the inflated structure tough enough to withstand forklift trucks and the like driving over the structure's floor or impacting the structure's walls.

Inflatable structures are available from ILC Dover, Frederica, Del. 19946 and L'Garde, Inc., Tustin, Calif. 92780.

Alternatively or in addition, rigid panels, such as plywood, fiberglass or other suitable material, is installed on either or both sides of an inflatable structure after it is inflated. Such material can also be installed on either or both sides of other embodiments of liner sheets or panels described herein.

Figure 14:
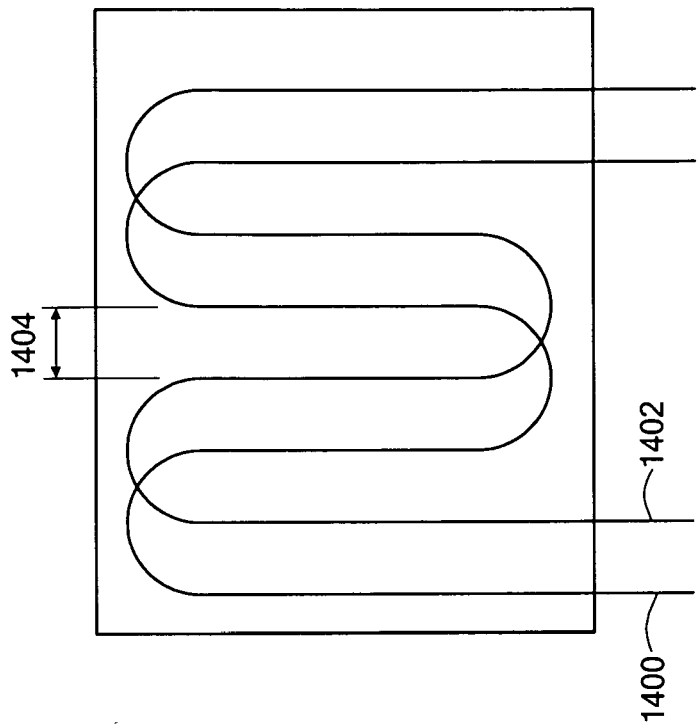
FIGS. 14 and 15 are plan views of liner sheets, each having more than one optical fiber, according to two embodiments of the present invention.
Figure 15:
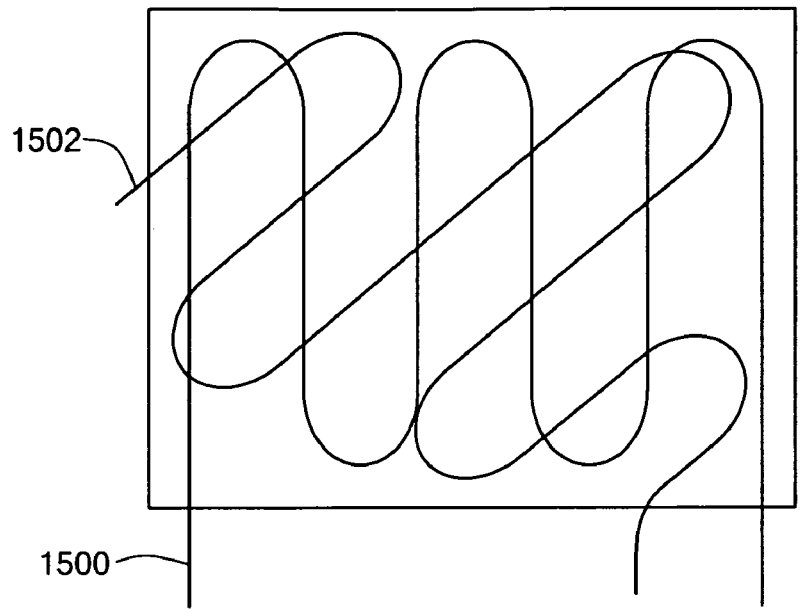

As noted, a pitch or spacing 108 between adjacent portions of the optical fiber 106 (FIG. 1) can be selected according to the minimum size breach in the container 100 that is to be detected. In the embodiment shown in FIG. 1, the spacing 108 is approximately equal to twice the radius of bend 116 in the optical fiber 106. However, many optical fibers have minimum practical bend radii. If such an optical fiber is bent with a radius less than this minimum, loss of light transmission through the bent portion of the optical fiber can occur. As shown in FIG. 14, to avoid such loss in situations where a pitch less than twice the minimum bend radius is desired, two or more optical fibers 1400 and 1402 can be can be interlaced. In such an embodiment, if N optical fibers are used and each optical fiber is bent at its minimum radius, the spacing (e.g. 1404) between the optical fibers can be approximately 1/N the minimum spacing of a single optical fiber. The optical fibers can be approximately parallel, as shown in FIG. 14, or they can be non-parallel. For example, as shown in FIG. 15, the optical fibers 1500 and 1502 can be disposed at an angle with respect to each other. Alternatively (not shown), two liner sheets can be used, one on top of the other, to line a single surface of a container. The optical fibers of these two liner sheets can, for example, be oriented at an angle to each other, offset from each other or otherwise to provide a tighter pitch than can be provided by one liner sheet alone or to provide redundant protection, such as for especially sensitive cargo. Of course, more than two liner sheets or layers of optical fiber within a single liner sheet can be used, each sheet or layer being offset from the others, to provide a yet tighter pitch than can be provided by one or two liner sheets alone.

Additional liner sheets or layers provide increased volumetric mass and, therefore, increased sensitivity to radiation induced darkening. If the source of radiation is considered to be a point source, additional liner sheets or layers also increase the total flux angle, i.e., the total angle (whose vertex is located at the point source of the radiation) of optical fiber that is illuminated by radiation.

Figure 16:
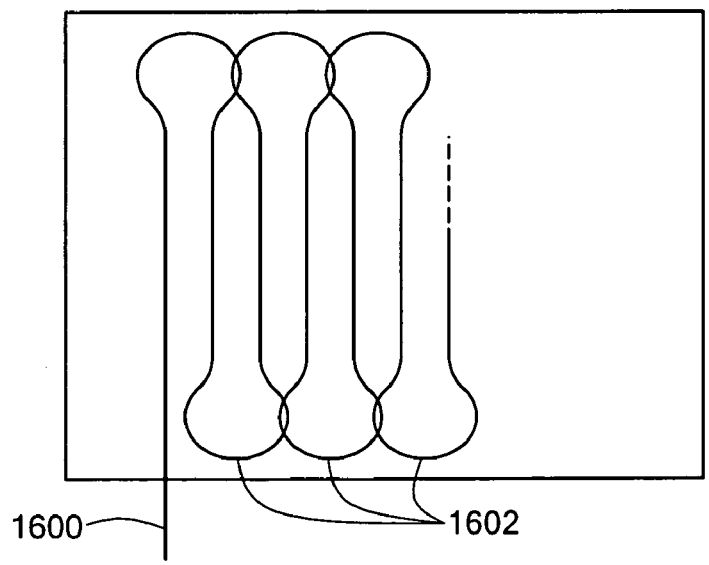
FIGS. 16, 17, 18 and 19 are plan views of liner sheets, each having one optical fiber, according to four embodiments of the present invention.
Figure 17:
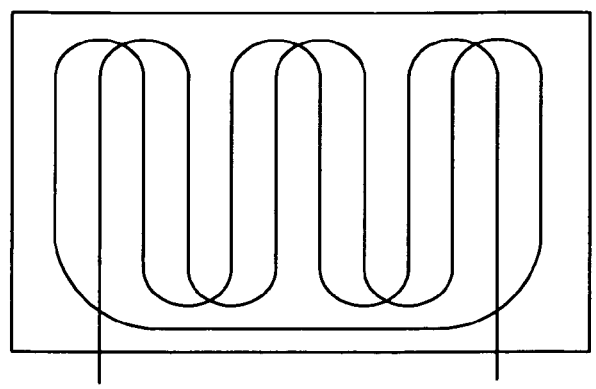
Figure 18:
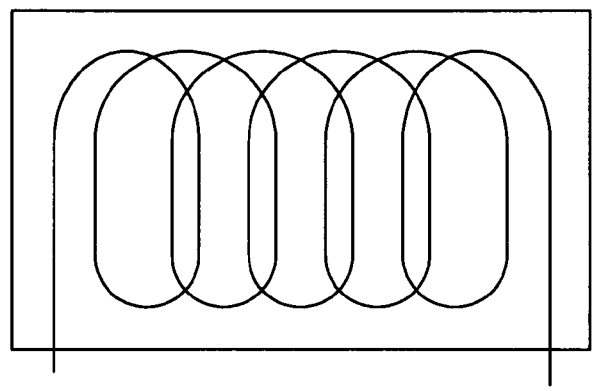
Figure 19:
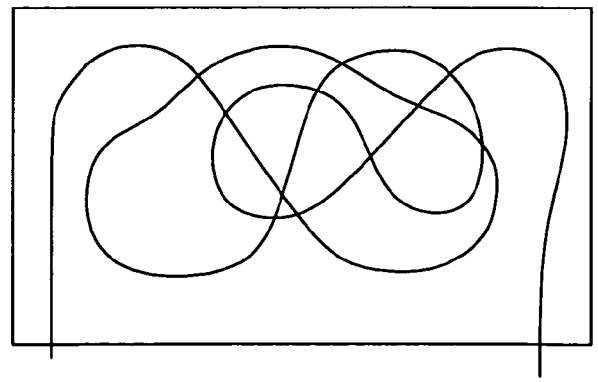

In another embodiment shown in FIG. 16, a single optical fiber 1600 can be configured so loops, such as those shown at 1602, at the ends of the optical fiber segments each occupy more than 180° of curvature and, thus, provide a reduced spacing. Other configurations of a single optical fiber providing a reduced spacing are shown in FIGS. 17, 18 and 19.

Figure 20:
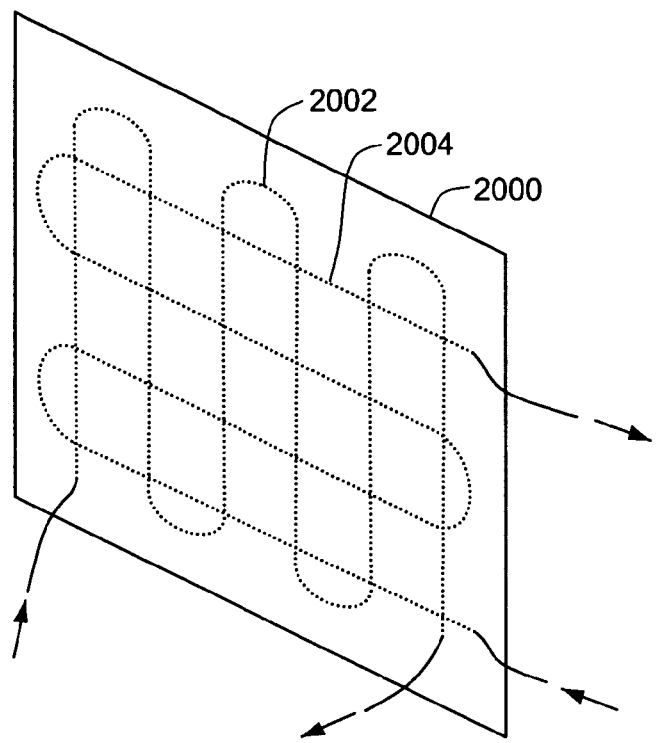
FIG. 20 is a perspective view of a liner sheet having more than one optical fiber, according to one embodiment of the present invention.
Figure 21:
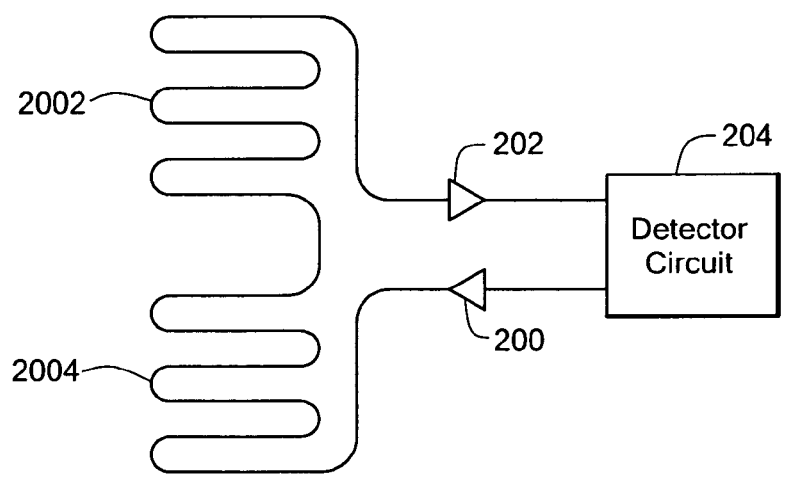
FIG. 21 is a simplified schematic diagram of the liner sheet of FIG. 14 and associated circuitry, according to one embodiment of the present invention.

As noted, more than one optical fiber can be included in each liner sheet. FIG. 20 shows a liner sheet 2000 with two optical fibers 2002 and 2004. As shown in FIG. 21, the optical fibers 2002, 2004 can be connected to each other in series, and the respective optical fibers can be connected to a single light source 200 and a single light detector 202. Alternatively (not shown), the optical fibers 2002, 2004 can be connected to each other in parallel, and the optical fibers can be connected to a single light source and a single light detector.

Figure 22:
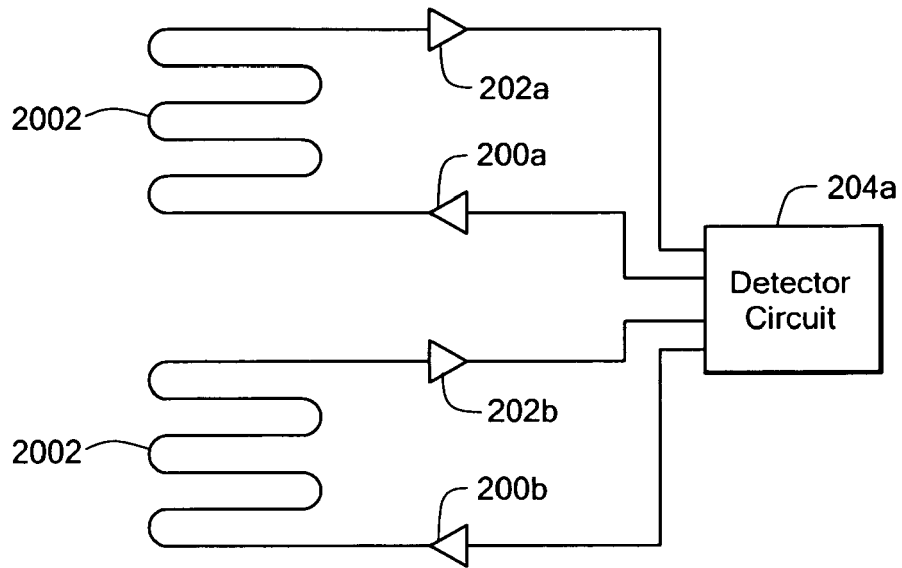
FIG. 22 is a simplified schematic diagram of the liner sheet of FIG. 14 and associated circuitry, according to another embodiment of the present invention.

In an alternative embodiment shown in FIG. 22, each optical fiber 2002, 2004 can be connected to its own light source 200*a* and 200*b* (respectively) and its own light detector 202*a* and 202*b* (respectively). In this case, signals from the optical fibers 2002, 2004 can be processes in series or in parallel by a detector circuit 204*a*.

A parallel connection of the optical fibers 2002, 2004, or a parallel processing of the signals from the optical fibers, would tolerate some breakage of the optical fibers without triggering an alarm. Such breakage might be expected, due to rough handling that the panels might undergo as containers are loaded and unloaded. The amount of light transmitted by several parallel optical fibers depends on the number of the optical fibers that remain intact. Once a container is loaded, the system could sense which fibers are intact and ignore damaged or severed fibers. Alternatively, the system could sense the amount of light being transmitted and set that amount as a reference amount. Later, in transit, if the amount of transmitted light fell below the reference amount, the system could signal a breach or shift in cargo, as discussed above. Of course, not all the optical fibers need be used at one time. Some of the optical fibers can be left as spares and used if primary optical fibers are damaged.

Figure 23:
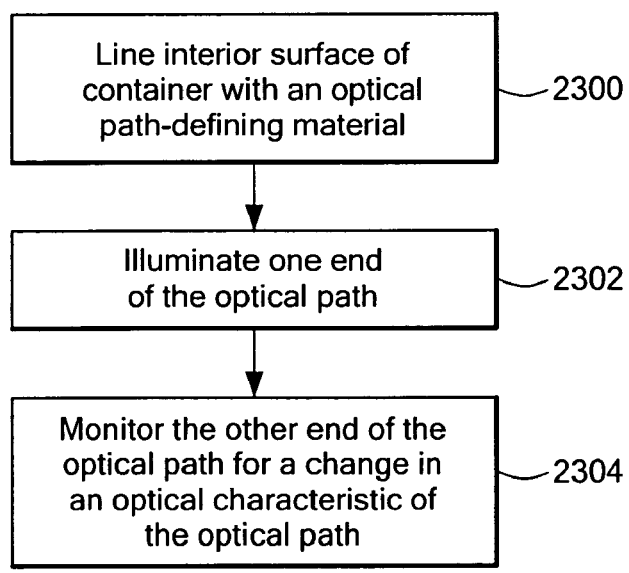
FIG. 23 is a simplified flowchart of a method of monitoring a container, according to one embodiment of the present invention.

Any of the above-described liner sheets or variations thereon can be used to monitor a container. FIG. 23 illustrates a process for monitoring a container. At 2300, at least one interior surface, or a portion thereof, is lined with an optical path-defining material. At 2302, one end of the optical path is illuminated. At 2304, the other end of the optical path is monitored for a change in an optical characteristic of the optical path.

Figure 31:
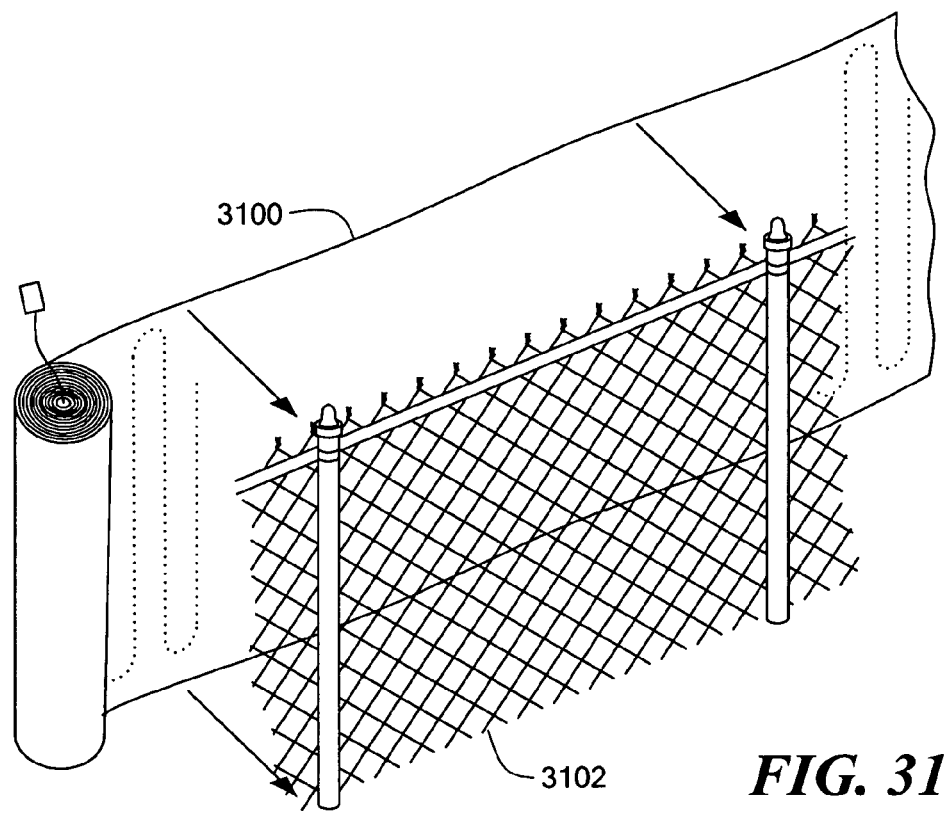
FIG. 31 is an exploded perspective view of a liner sheet attached to a fence, according to another embodiment of the present invention.

The invention has been described in relation to closed (i.e. entirely surrounded) containers, rooms and the like, however embodiments are also applicable to protecting open areas, such as yards. For example, as shown in FIG. 31, a liner panel 3100 can be attached to a fence 3102, such as a chain link fence, to monitor the fence for breaches thereof or radiation near the fence. For example, the flexible liner sheet described above with reference to FIG. 7 can be attached to the fence by any suitable fastener. For example, the liner sheet 3100 can include eyelets, and the liner sheet can be attached to the fence by screws, twisted wires or the like. Alternatively, one or more flexible, rigid or semi-rigid panels can be attached to the fence and interconnected in series, as discussed above. A relatively long liner sheet attached to a fence integrates nuclear radiation, as discussed above. Therefore, such a liner sheet is sensitive to relatively low-level radiation in its vicinity.

In an alternative implementation, a thin electrical wire or path can be utilized rather than the optical fiber described above. For example, a thin electrical wire can be arranged in a zigzag path across the area of a panel or woven into a fabric to provide breakage detection similar to that of the fiber optic embodiment described above. An electrical signal or energy source and electrical detector detects a break in the conductive path.

While the invention has been described with reference to a preferred embodiment, those skilled in the art will understand and appreciate that variations can be made while still remaining within the spirit and scope of the present invention, as described in the appended claims. For example, although some embodiments were described in relation to shipping containers used to transport cargo, these containers can also be used to store cargo in warehouses, yards and the like, as well as during loading and unloading of the containers at a loading dock. Some embodiments were described in relation to shipping containers used on ships, etc. These and other embodiments can also be used with shipping boxes and other types of containers. The invention can also be used to detect tampering with, or a break into or out of, a room of a structure, such as an office, vault or prison cell. The term "container" in the claims is, therefore, to be construed broadly to include various types of shipping containers and boxes, as well as rooms and open areas, such as yards, that are surrounded by fences or the like. Functions described above, such as differential amplifiers, comparisons, triggers and alarms, can be implemented with discrete circuits, integrated circuits and/or processors executing software or firmware stored in memory. In addition, the optical paths have been described as being created using optical fibers. Other mechanisms can, however, be used to create optical paths. For example, hollow tubes and mirrors or combinations of technologies can be used to define optical paths through panels.

What is claimed is:

1. A tamper detection system for a multisided container, comprising:
    a plurality of inflatable liner panels, each sized to line an interior wall of a respective side of the container;
    each of the inflatable liner panels having an optical fiber therein and extending in a path across substantially the entire area of the panel, the optical fiber having a first end and a second end; and
    each of the inflatable liner panels having a first coupler connected to the first end of the optical fiber and a second coupler connected to the second end of the optical fiber;
    wherein at least one of the couplers of each panel is operative to interconnect to at least one of the couplers of another panel to provide a continuous path through the interconnected optical fibers of the interconnected panels.

2. The tamper detection system of claim 1, further comprising:
    a circuit operable to detect a change in an optical characteristic of the path.

3. The tamper detection system of claim 2, further comprising:
    a light source optically connected to one end of the path; and
    a light detector optically connected to another end of the path, wherein the circuit uses a signal from the light detector to detect the change in the optical characteristic of the path.

4. The tamper detection system of claim 3, further comprising:
    a wireless transmitter connected to the circuit and operable to transmit a signal if the circuit detects the change in the optical characteristic of the path.

5. The tamper detection system of claim 1, wherein each of the plurality of inflatable liner panels comprises a rigidizable material.

6. The tamper detection system of claim 1, wherein each of the plurality of inflatable liner panels is sized to line at least a portion of an interior wall of a rectangular shipping container.

7. The tamper detection system of claim 6, wherein the plurality of inflatable liner panels is sized to line at least five interior walls of the rectangular shipping container; the tamper detection system further comprising a second inflatable liner panel having an optical fiber extending in a path across substantially the entire area of the second liner panel, the second inflatable liner panel being sized to line another interior wall of the rectangular shipping container and hinged to swing and provide access to the interior of the shipping container.

8. The tamper detection system of claim 7, wherein the plurality of inflatable liner panels inflate in a predetermined sequence.

9. The tamper detection system of claim 1, wherein each of the plurality of inflatable liner panels is sized and shaped to line at least a portion of an interior wall of an aircraft shipping container.

10. The tamper detection system of claim 1, wherein the optical fiber includes a dopant comprising a fissionable material.

11. The tamper detection system of claim 10, wherein the fissionable material comprises Uranium.

12. The tamper detection system of claim 1, wherein the optical fiber of each of the plurality of inflatable liner panels extends in a serpentine path across substantially the entire area of the panel.

13. The tamper detection system of claim 1, wherein at least one of the inflatable liner panels has a second optical fiber extending in a path across substantially the entire area of the panel.

14. The tamper detection system of claim 1, wherein at least some of the plurality of inflatable liner panels has at least two layers of optical fiber.

15. The tamper detection system of claim 3, wherein the light source is configured to produce light having a wavelength less than or equal to about 980 nm.

16. The tamper detection system of claim 15, wherein the light source is configured to produce light having a wavelength less than or equal to about 600 nm.

17. The tamper detection system of claim 15, wherein the light source is configured to produce light having a wavelength less than or equal to about 540 nm.

18. The tamper detection system of claim 15, wherein the light source is configured to produce light having a wavelength less than or equal to about 502 nm.

19. The tamper detection system of claim 15, wherein the light source is configured to produce light having a wavelength less than or equal to about 472 nm.

20. A detection system for a multisided container, comprising;
    a plurality of inflatable liner panels each sized to line an interior wall of a respective side of the container;
    each of the inflatable liner panels having an annealing-resistant optical fiber embedded therein and extending in a path across substantially the entire area of the panel, the annealing-resistant optical fiber having a first end and a second end;
    the annealing-resistant optical fiber being reactive to nuclear radiation impinging on the panel to cause a decrease in light-carrying capacity of the annealing-resistant optical fiber;
    the ends of the annealing-resistant optical fiber of the plurality of inflatable liner panels being interconnected to provide a continuous optical path through the plurality of inflatable liner panels;
    a light source optically coupled to one end of the annealing-resistant optical fiber path of the interconnected inflatable liner panels for introducing light;
    a light detector optically coupled to the other end of the optical path of the interconnected inflatable liner panels for receiving light from the optical path; and
    a circuit connected to the light detector and operative to detect the decrease in light-carrying capacity of the annealing-resistant optical fiber and to provide an indication thereof.

21. The tamper detection system of claim 1 wherein at least one of the plurality of inflatable liner panels has at least one hingable region extending across the panel to define at least two foldable portions of the panel.

22. The tamper detection system of claim 20 including:
    at least one heat sensor disposed in the container operative to detect the temperature within the container and to provide a signal indication of the temperature.

23. The tamper detection system of claim 20 wherein each of the plurality of inflator liner panels has a thermal insulator to thermally insulate the container.

* * * * *

UNITED STATES PATENT AND TRADEMARK OFFICE
CERTIFICATE OF CORRECTION

PATENT NO.         : 7,394,060 B2                                           Page 1 of 1
APPLICATION NO.    : 11/349049
DATED              : July 1, 2008
INVENTOR(S)        : Gilbert D. Beinhocker It is certified that error appears in the above-identified patent and that said Letters Patent is hereby corrected as shown below:

Title Pg, Item (54), Title, "HAVING" should read --HAVING A--;

Column 1, line 1, "HAVING" should read --HAVING A--;

Column 12, line 53, "400402" should read --400-402--;

Column 14, line 43, "comer" should read --corner--; and

Column 14, line 44, "comer" should read --corner--.

Signed and Sealed this

Sixteenth Day of June, 2009

JOHN DOLL
*Acting Director of the United States Patent and Trademark Office*